US010237691B2

(12) United States Patent
Cheung et al.

(10) Patent No.: US 10,237,691 B2
(45) Date of Patent: Mar. 19, 2019

(54) PROXIMAL PHYSICAL LOCATION TRACKING AND MANAGEMENT SYSTEMS AND METHODS

(71) Applicant: Quintrax Limited, Wong Chuk Hang (HK)

(72) Inventors: Alan Cheung, Shouson Hill (HK); Mark Gregory Kefford, Wan Chai (HK); Jason Scott Anderssen, Brisbane (AU)

(73) Assignee: QUINTRAX LIMITED, Wong Chuk Hang (HK)

( * ) Notice: Subject to any disclaimer, the term of this patent is extended or adjusted under 35 U.S.C. 154(b) by 0 days.

(21) Appl. No.: 15/673,363

(22) Filed: Aug. 9, 2017

(65) Prior Publication Data
US 2019/0053003 A1 Feb. 14, 2019

(51) Int. Cl.
H04W 4/02 (2018.01)
H04W 4/80 (2018.01)
H04W 4/04 (2009.01)

(52) U.S. Cl.
CPC ............ H04W 4/023 (2013.01); H04W 4/04 (2013.01); H04W 4/80 (2018.02)

(58) Field of Classification Search
USPC .......................................... 455/404.1, 404.2
See application file for complete search history.

(56) References Cited

U.S. PATENT DOCUMENTS

| 3,986,119 A * | 10/1976 | Hemmer, Jr. ........ G08B 25/016 340/286.13 |
| 5,091,930 A * | 2/1992 | Shapiro ................ G08B 25/016 379/38 |
| 5,319,376 A * | 6/1994 | Eninger ................ B63B 22/003 342/357.4 |
| 5,771,001 A * | 6/1998 | Cobb .................... A61B 5/0002 128/903 |
| 5,784,005 A * | 7/1998 | Akutsu ................ G08B 25/016 340/905 |
| 7,671,732 B1 * | 3/2010 | Sennett .................... G08B 6/00 340/539.11 |

(Continued)

Primary Examiner — Nay A Maung
Assistant Examiner — Erica L Fleming-Hall
(74) Attorney, Agent, or Firm — AEON Law; Adam L. K. Philipp; David V. H. Cohen

(57) ABSTRACT

Systems and methods for monitoring the physical proximity of beacon devices relative to a deployment of relay devices. Beacon device may broadcast a proximate data signal receivable relay devices within range. Upon receiving a proximate data signal from a beacon, a relay is configured to provide a corresponding notification to a monitoring server. During standard operation, a beacon device is configured to broadcast the proximate data signal at a first frequency. A beacon may include an emergency trigger, as well as possible optional emergency detection sensors. Upon detecting an emergency, a beacon device broadcasts a proximate data signal at a second frequency and/or modify the proximate data signal. The monitoring server monitors the frequency of transmission and/or content of the proximate data signals from the beacon devices and, upon detecting an emergency (or the absence of an expected proximate data signal from a beacon), may provide an emergency alert.

19 Claims, 23 Drawing Sheets

(56) References Cited

U.S. PATENT DOCUMENTS

| | | | |
|---|---|---|---|
| 8,955,421 B1* | 2/2015 | Kountotsis | F41C 27/00 89/1.11 |
| 9,369,964 B2* | 6/2016 | Panchal | H04W 52/0251 |
| 2005/0075116 A1* | 4/2005 | Laird | A61B 5/04 455/456.3 |
| 2009/0199232 A1* | 8/2009 | Takeyama | H04N 5/76 725/33 |
| 2011/0134897 A1* | 6/2011 | Montemurro | H04M 1/72536 370/338 |
| 2012/0064855 A1* | 3/2012 | Mendelson | G01C 21/206 455/404.2 |
| 2013/0294304 A1* | 11/2013 | Schoppmeier | H04L 12/12 370/311 |
| 2014/0031002 A1* | 1/2014 | Ranki | G01S 5/0027 455/404.2 |
| 2014/0051379 A1* | 2/2014 | Ganesh | H04M 1/72538 455/404.1 |
| 2014/0094132 A1* | 4/2014 | Ravindran | H04B 1/1615 455/182.1 |
| 2014/0134970 A1* | 5/2014 | Pazos | H04L 65/4069 455/404.1 |
| 2014/0143802 A1* | 5/2014 | Hamada | H04N 21/4755 725/33 |
| 2014/0171016 A1* | 6/2014 | Sennett | H04M 11/04 455/404.2 |
| 2014/0171025 A1* | 6/2014 | Graube | H04W 4/021 455/411 |
| 2015/0029866 A1* | 1/2015 | Liao | H04W 4/023 370/241 |
| 2015/0289088 A1* | 10/2015 | Terrazas | H04W 4/02 455/404.2 |
| 2016/0007383 A1* | 1/2016 | Chae | H04W 76/023 455/404.1 |
| 2016/0043827 A1* | 2/2016 | Filson | H04K 3/22 370/252 |
| 2016/0057596 A1* | 2/2016 | Thompson | H04W 4/90 455/404.1 |
| 2016/0065719 A1* | 3/2016 | Jeong | H04W 12/06 455/420 |
| 2016/0156638 A1* | 6/2016 | Somani | H04L 63/12 726/7 |
| 2016/0156723 A1* | 6/2016 | Seo | H04L 67/148 709/228 |
| 2016/0165424 A1* | 6/2016 | El-Dinary | H04W 4/90 455/404.2 |
| 2016/0189514 A1* | 6/2016 | Todasco | G08B 21/02 340/8.1 |
| 2016/0292978 A1* | 10/2016 | Lee | H04W 4/06 |
| 2016/0324472 A1* | 11/2016 | Kaskoun | A61B 5/6833 |
| 2017/0085417 A1* | 3/2017 | O'Reirdan | H04L 41/0668 |
| 2017/0099567 A1* | 4/2017 | Kwon | H04W 4/008 |
| 2017/0111779 A1* | 4/2017 | Sennett | H04W 4/22 |
| 2017/0118789 A1* | 4/2017 | Lee | H04W 76/025 |
| 2017/0171690 A1* | 6/2017 | Kim | H04W 4/00 |
| 2017/0236403 A1* | 8/2017 | Yang | G08B 25/10 340/539.13 |
| 2017/0251347 A1* | 8/2017 | Mehta | H04W 4/22 |
| 2017/0265758 A1* | 9/2017 | Raman | G01S 19/32 |
| 2017/0287302 A1* | 10/2017 | Howard | G08B 21/0272 |
| 2017/0310827 A1* | 10/2017 | Mehta | H04M 3/42042 |
| 2017/0316677 A1* | 11/2017 | Messier | H01Q 1/40 |
| 2017/0325056 A1* | 11/2017 | Mehta | H04W 4/02 |

* cited by examiner

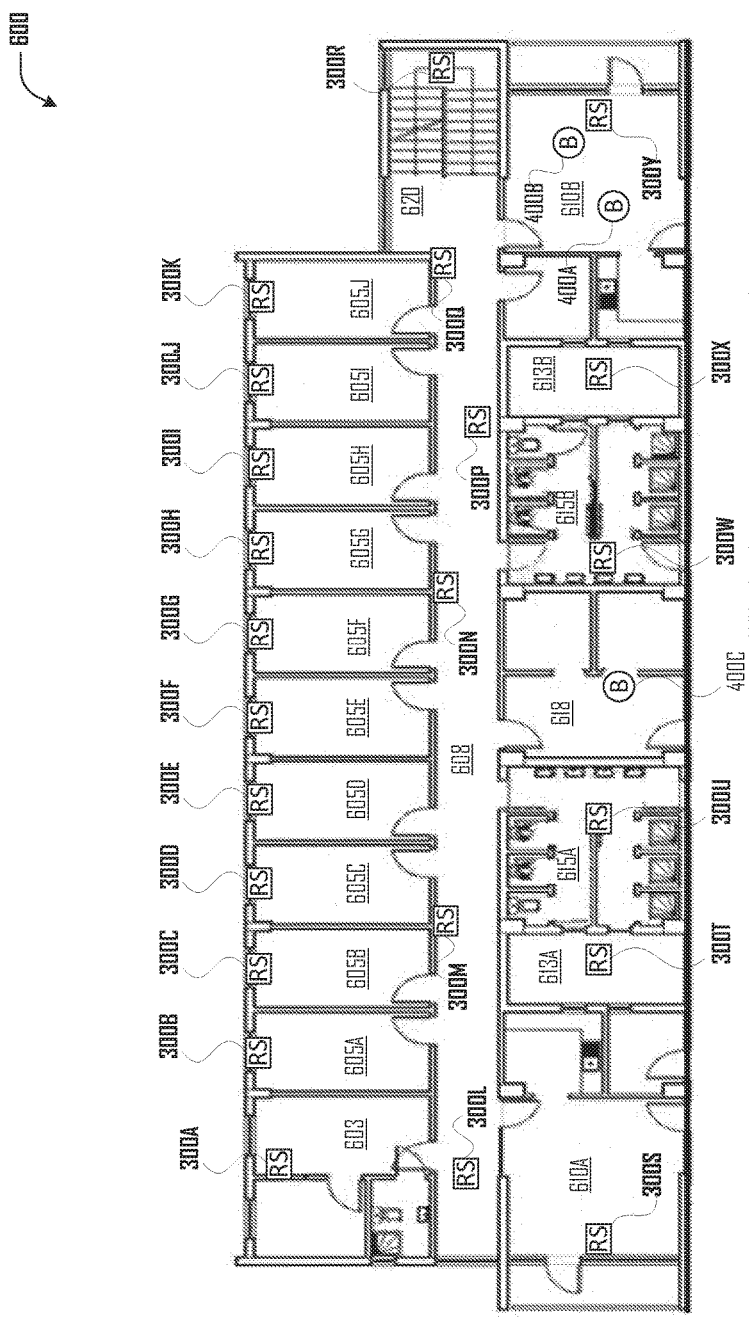

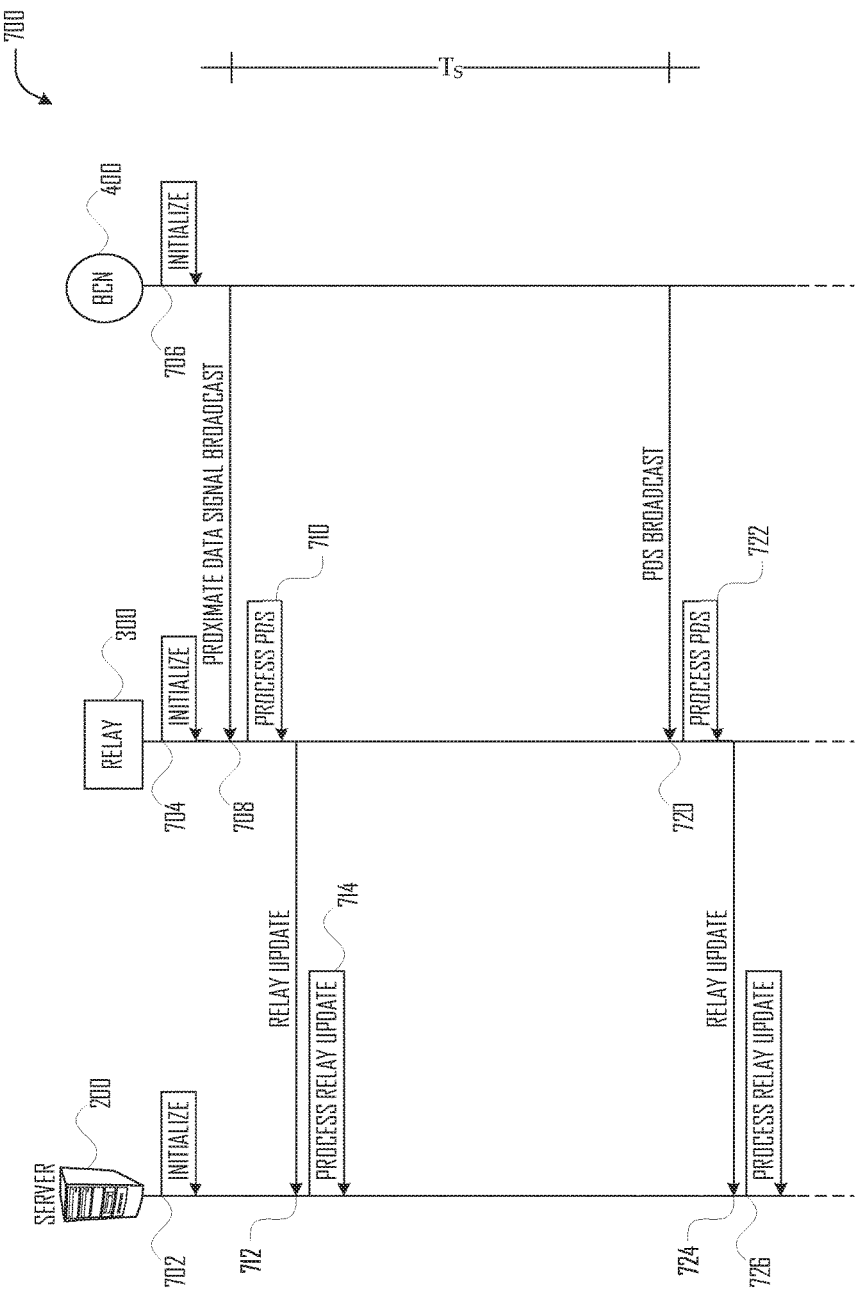

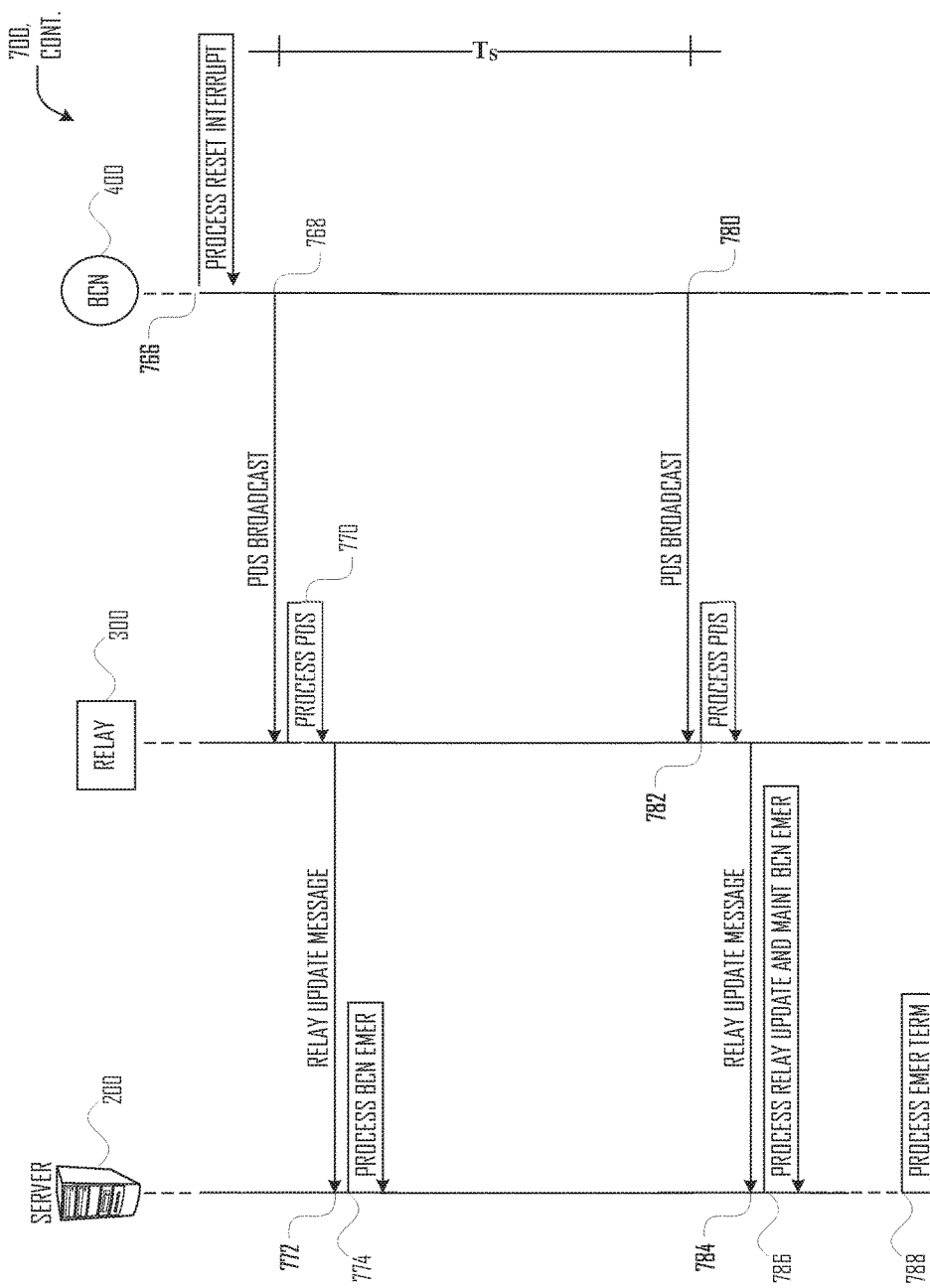

PROXIMAL PHYSICAL LOCATION TRACKING AND MANAGEMENT SYSTEMS AND METHODS

FIELD

The present disclosure relates to computing, and more particularly, to systems and methods for utilizing the transmission rate of a proximate data signal broadcast to detect and monitor emergencies.

BACKGROUND

The Bluetooth standard ("Bluetooth") is a wireless technology standard for exchanging data over short distances (using short-wavelength ultra-high frequency radio waves in the ISM radio band ranging from 2.4 to 2.485 GHz) from fixed and mobile devices, and building personal area networks ("PANs"). The Bluetooth standard is a wire-replacement communications protocol primarily designed for low-power consumption, with a short range based on relatively low-cost transceiver microchips. Because the devices use a radio (broadcast) communications system, they do not have to be in visual line of sight of each other. The effective range of communication between Bluetooth devices varies due to propagation conditions, material coverage, production sample variations, antenna configurations and battery conditions. Other versions include Bluetooth Low Energy ("Bluetooth LE"), which is a wireless personal area network technology designed and marketed by the Bluetooth Special Interest Group aimed at applications in the healthcare, fitness, beacons, security, and home entertainment industries. Compared to Classic Bluetooth, Bluetooth LE is intended to provide considerably reduced power consumption and cost while maintaining a similar communication range.

Bluetooth uses a packet-based protocol with a master-slave structure. A master device may be in data communication with a plurality of slave devices, forming a piconet. All devices in a piconet share the master device's clock.

A Bluetooth device in discoverable mode transmits the following information on demand: device name, device class, list of services, and technical information such as device features, manufacturer, Bluetooth specification used, clock offset, and the like.

Any device may perform an inquiry to find other devices to connect to, and any device can be configured to respond to such inquiries. Every Bluetooth device has a unique 48-bit identifying address.

For security reasons, a device with hardware and software that implement the Bluetooth standard (a "Bluetooth device") is provided with selective control over which other remote Bluetooth devices can connect to it. At the same time, it is useful for Bluetooth devices to be able to establish a connection with other Bluetooth devices without user intervention (for example, as soon as the devices are in range of each other).

To resolve these competing priorities, Bluetooth uses a process called device pairing to create bonds between devices. The pairing process may either be triggered either by an explicit request to generate a bond (for example, a user of a device requests to "Add a Bluetooth device") or be triggered automatically when connecting to a new device where the identity of the new device is required for security purposes. When pairing successfully completes, a bond forms between the two devices, enabling those two devices to connect to each other in the future without repeating the pairing process to confirm device identities.

During pairing, the two Bluetooth devices may establish a relationship by creating a shared link key. If both devices store the same link key, they are said to be paired or bonded. A device that wants to communicate only with a bonded device can cryptographically authenticate the identity of the other device, ensuring it is the same device it previously paired with. Once a link key is generated, an authenticated asynchronous connectionless link between the devices may be encrypted to protect exchanged data against eavesdropping.

Bluetooth devices may be used to implement device location tracking within a defined area, for example by deploying a plurality of Bluetooth devices in known fixed locations in the defined area and providing one or more mobile Bluetooth devices to the people or equipment to be tracked. The mobile Bluetooth devices may be set to automatically connect with the fixed Bluetooth devices, making it possible to determine the location of the mobile Bluetooth device based on which fixed Bluetooth device(s) it is connected to.

Conventional Bluetooth device implementations of local location tracking may not be scalable to practical commercial deployments due to the potential of excessive power consumption on the part of the mobile devices and "connectorial explosion" problems (analogous to the combinatorial explosion problem, but refers to exponential increases in connections) on the part of the fixed devices.

BRIEF DESCRIPTION OF THE DRAWINGS

FIGS. 6A-B illustrate respective first and second states of an exemplary deployment of a proximal physical location tracking and management system in accordance with at least one embodiment overlaid over a facility floorplan.

FIGS. 7A-C illustrate a first exemplary series of communications between various devices in accordance with at least one embodiment.

DESCRIPTION

Figure 1A:
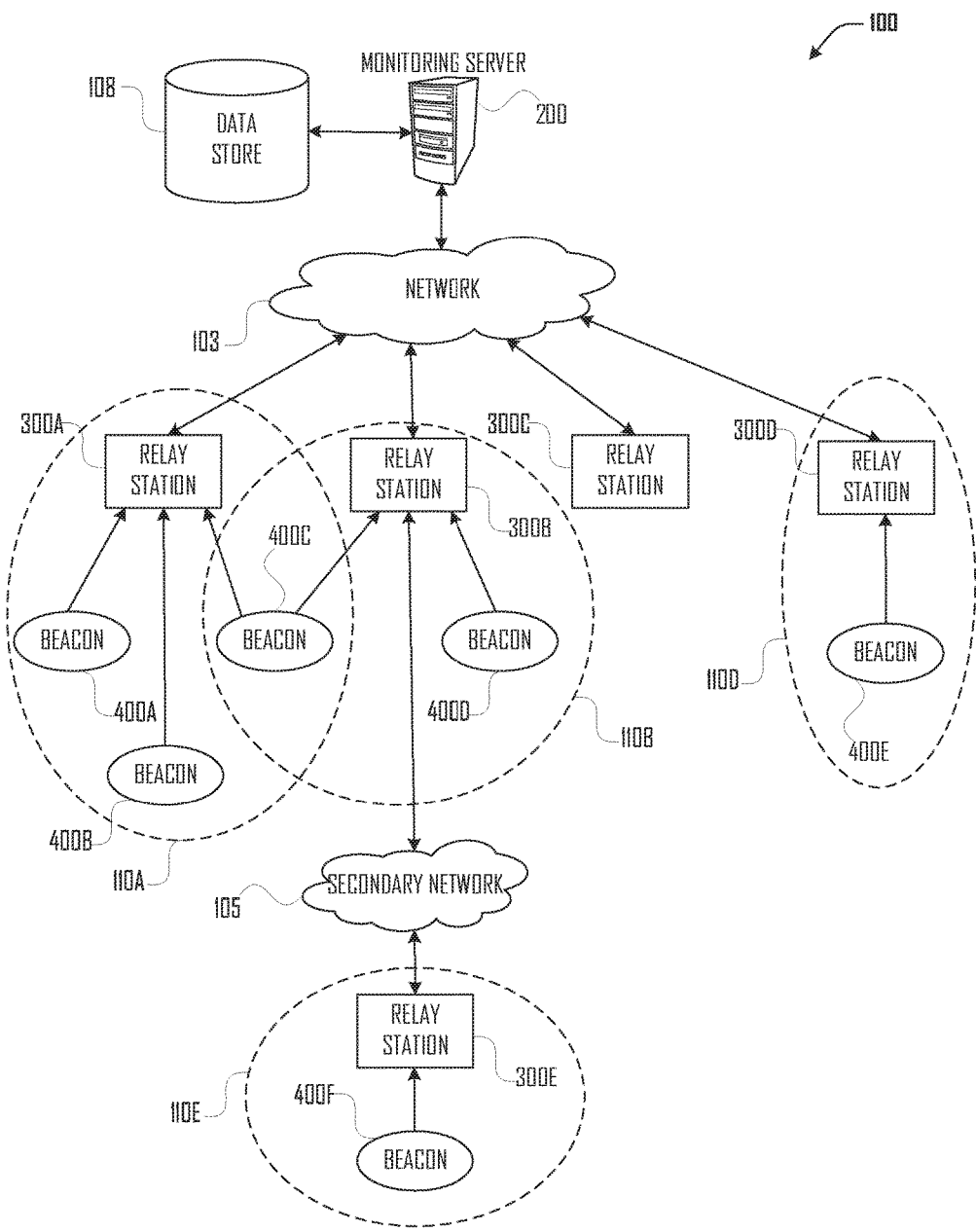
FIGS. 1A-B illustrate respective first and second states of an exemplary network topology of a proximal physical location tracking and management system in accordance with at least one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network, which may include, but is not limited to, the Internet.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Provided herein are systems and methods for monitoring the physical proximity of one or more beacon devices relative to a deployment of relay devices. Each beacon device may broadcast a proximate data signal receivable by any relay device within range. The proximate data signal may have a timestamp and a data payload (e.g. a single status bit). Upon receiving a proximate data signal from a beacon, a relay is configured to provide a corresponding notification to a monitoring server. The corresponding notification may include the timestamp and data payload received from the beacon. During standard operation, a beacon device may be configured to broadcast the proximate data signal at a first frequency, e.g. every 500 milliseconds, and having a data payload with a value indicating normal operation. A beacon may include an emergency trigger, as well as one or more optional emergency detection sensors. For example, a beacon may take the form of a bracelet, anklet, or the like. Such a beacon may have a clasp and an emergency trigger that is activated upon the clasp being undone, or the bracelet otherwise being cut or removed from a wearer's wrist. Upon detecting an emergency, e.g. due to a beacon-bracelet being removed from a wearer's wrist, the beacon device may be configured to broadcast the proximate data signal at a second frequency, e.g., every 20 milliseconds, and/or to transmit a proximate data signal with a data payload indicating emergency operation. The monitoring server may monitor the frequency of transmission of the proximate data signals from the beacon devices, as well as the value of the data payload, and, upon detecting an emergency (or the absence of an expected proximate data signal from a beacon), may provide an emergency alert.

An Exemplary Network Topology

Figure 1B:
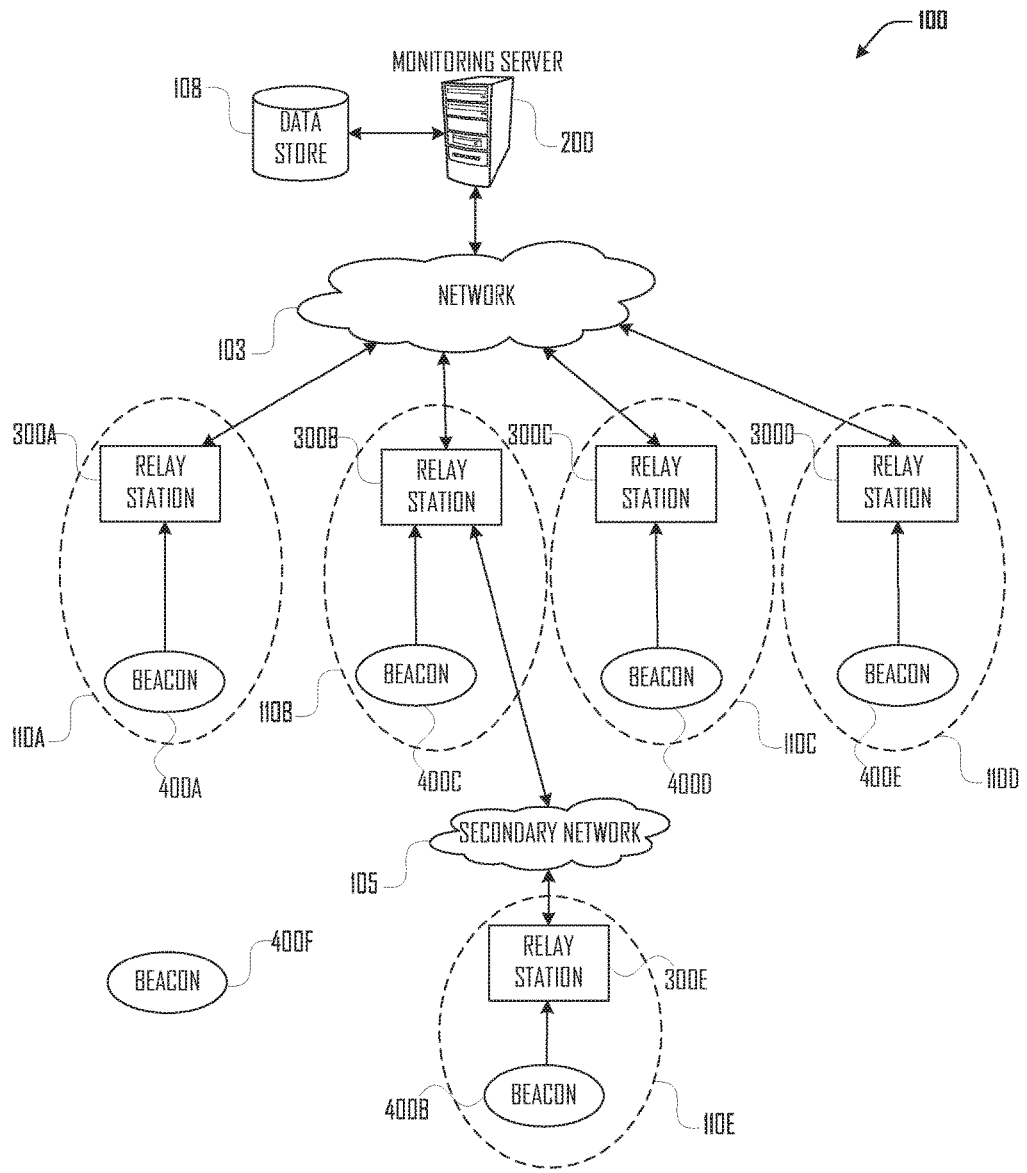

FIGS. 1A-B illustrates two respective states of an exemplary network topology of a proximal physical location tracking and management system 100 in accordance with various embodiments of the present methods and systems.

Referring to FIG. 1A, a monitoring server 200 and one or more relay stations, such as relay stations 300A-E, may be in data communication with a network 103. Monitoring server 200 may be in data communication with a data store 108. In various embodiments, network 103 may include the Internet, one or more local area networks ("LANs"), one or more wide area networks ("WANs"), cellular data networks, and/or other data networks. Network 103 may, at various points, be a wired and/or wireless network. Relay station(s) 300 may be physically distributed throughout a deployment area, such as one or more buildings, a campus, or the like (see, e.g., the discussion of FIGS. 5A-6B, below). One or more relay stations, such as relay station 300E and relay station 300B in the example shown in FIGS. 1A-B, may be in data communication with a secondary network 105, allowing relay station 300E to be in data communication with monitoring server via data communication with relay station 300B. In various embodiments, secondary network 105 may include one or more local area networks ("LANs"), cellular data networks, and/or other data networks. Secondary network 105 may, at various points, be a wired and/or wireless network.

The embodiment of proximal physical location tracking and management system 100 illustrated in FIGS. 1A-B includes beacons 400A-F. Each of beacons 400A-F may periodically broadcast a proximate data signal that may be received by one or more of relay stations 300A-E, depending on each beacon's relative physical proximity to the relay stations, as indicated by physically proximate areas 110A-E. As is explained in more detail below, the proximate data signal broadcast may include a Bluetooth device pairing request or the like.

In the state illustrated in FIG. 1A, the proximate data signals broadcast by beacons 400A-B may be received by relay station 300A; the proximate data signal broadcast by beacon 400C may be received by relay station 300A and relay station 300B; the proximate data signal broadcast by beacon 400D may be received by relay station 300B; the proximate data signal broadcast by beacon 400E may be received by relay station 300D; and the proximate data signal broadcast by beacon 400F may be received by relay station 300E.

In the state illustrated in FIG. 1B, which may, for example, represent the proximal physical location tracking and management system 100 at an earlier or later time than the state illustrated in FIG. 1A, the proximate data signals broadcast by beacon 400A may be received by relay station 300A; the proximate data signal broadcast by beacon 400C may be received by relay station 300B; the proximate data signal broadcast by beacon 400D may be received by relay station 300C; the proximate data signal broadcast by beacon 400E may be received by relay station 300D; and the proximate data signal broadcast by beacon 400B may be received by relay station 300E. In the state illustrated in FIG. 1B, the proximate data signal broadcast by beacon 400F is not being received by any of relay stations 300A-E. Monitoring server 200 may be in data communication with a data store 108.

In various embodiments, monitoring server 200 may be a networked computing device generally capable of accepting requests over network 103, e.g. from relay stations 300A-E and/or other networked computing devices (not shown), and providing responses accordingly. The primary functional components of an exemplary server, such as monitoring server 200, are described below with reference to FIG. 2.

In various embodiments, each of relay stations 300A-E may be a networked computing device having an arbitrary form factor including a single-board computer, a general-purpose computer (including "laptop," "notebook," "tablet" computers, or the like); a mobile phone; a motor vehicle head unit; or the like. The primary functional components of an exemplary, form-factor-independent relay station 300, such as relay stations 300A-E, are described below in reference to FIG. 3.

In various embodiments, each of beacons 400A-F may be a computing device having an arbitrary form factor including a mobile computing device having a form factor such as a wearable computing device (including pendants, bracelets, watches, glasses, fitness trackers, or the like). The primary functional components of an exemplary, form-factor-independent beacon, such as beacons 400A-F, are described below with reference to FIG. 4.

Exemplary Monitoring Server

Figure 2:
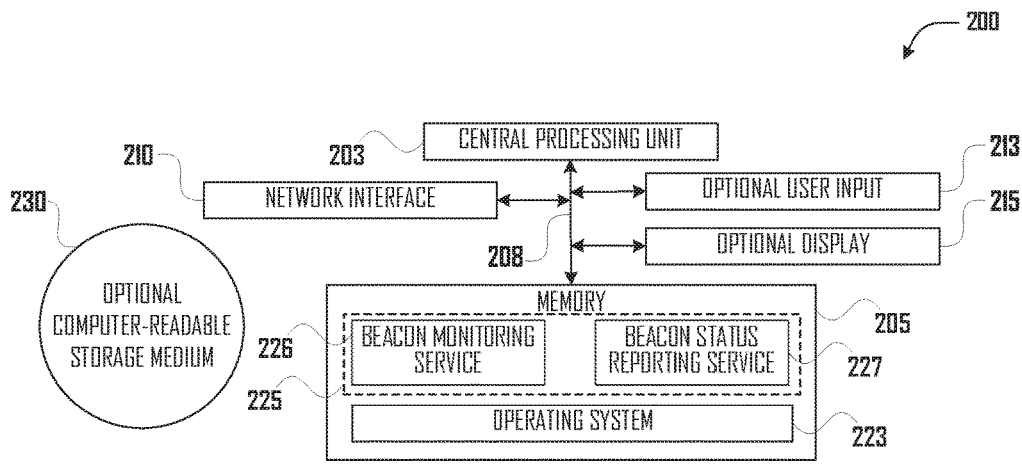
FIG. 2 illustrates several components of an exemplary monitoring server in accordance with at least one embodiment.

FIG. 2 illustrates several components of an exemplary monitoring server 200. However, the present methods and systems do not depend on any particular internal configuration of a monitoring server.

As shown in FIG. 2, exemplary monitoring server 200 includes a central processing unit 203 in data communication with a memory 205 via a bus 208. Central processing unit 203 is an electronic circuit designed to carry out instructions of a computer program, e.g. obtained from memory 205, by performing the basic arithmetic, logical, control and input/output (I/O) operations specified by the program's instructions. Memory 205 may generally include some or all of random access memory (RAM), read-only memory (ROM), and/or a permanent mass storage device, such as a disk drive, flash memory, or the like. Bus 208 is a communication system that transfers data between components within exemplary server 200, and includes any related hardware components (wire, optical fiber, etc.) and software, including communication protocols.

Monitoring server 200 may also include a network interface 210 for connecting to a network such as network 103, one or more optional user input device(s) 213, e.g. an alphanumeric keyboard, keypad, a mouse or other pointing device, a touchscreen, and/or a microphone, (or a user input port for connecting an external user input device) and/or an optional display 215 (or a display port for connecting an external display device), both interconnected along with the network interface 210 via bus 208. In some embodiments, server 200 may include many more components than those shown in FIG. 2. However, it is not necessary that all of these generally conventional components be shown in order to disclose an illustrative embodiment.

Memory 205 may store an operating system 223 and program code for various software services 225. For example, monitoring server 200 may include executable instructions for performing a beacon monitoring service 226 and a beacon status reporting service 227.

Program code for these and other such software services (not shown) may be loaded into memory 205 from a non-transient computer readable storage medium 230 using a drive mechanism (not shown) associated with the non-transient computer readable storage medium, such as, but not limited to, a DVD/CD-ROM drive, memory card, or the like. Software components may also be loaded into memory 205 via the network interface 210. Server 200 may also communicate via bus 208 with a database (not shown), such as data store 105, or other local or remote data store.

In operation, operating system 223 manages the hardware and software resources of monitoring server 200 and provides common services and memory allocation for various software services, such as beacon monitoring service 225A or beacon status reporting service 225B. For hardware functions, such as network communications via network interface 210 and allocation of memory 205 for various software services, such as beacon monitoring service 225A or beacon status reporting service 225B, operating system 223 may act as an intermediary between software executing on monitoring server 200 and the server's hardware.

Although an exemplary monitoring server 200 has been described having hardware components that generally conform to a conventional general-purpose computing device, a server may be any of a great number of devices capable of communicating with network 103 and executing instructions for performing beacon monitoring service 225A and/or beacon status reporting service 225B.

In some embodiments, a monitoring server 200 may comprise one or more replicated and/or distributed physical or logical devices. The present methods and systems do not depend on any particular internal configuration of monitoring server 200.

Exemplary Relay Station

Figure 3:
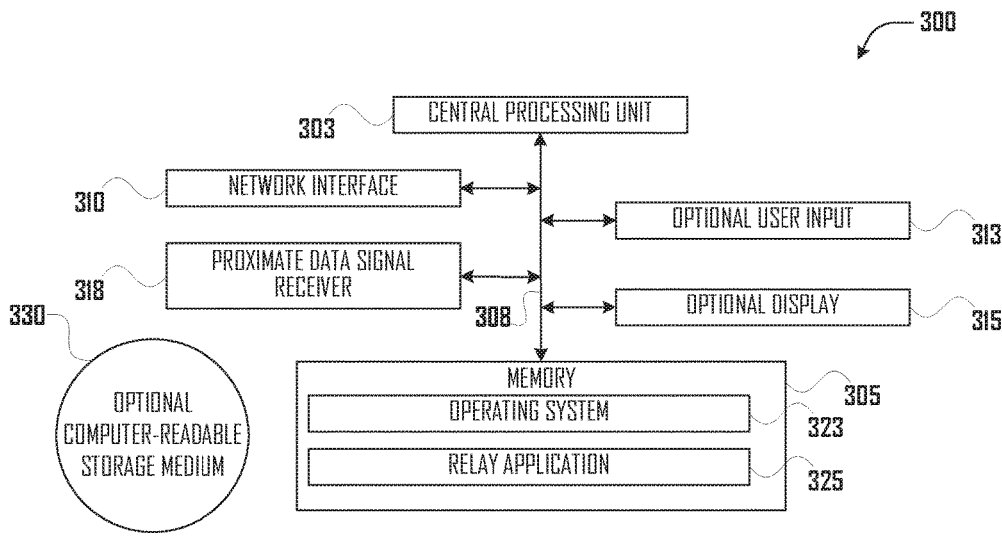
FIG. 3 illustrates several components of an exemplary relay in accordance with at least one embodiment.

FIG. 3 illustrates several components of an exemplary relay station 300, such as any of relay stations 300A-E. However, the present methods and systems do not depend on any particular internal configuration of a relay station.

As shown in FIG. 3, exemplary relay station 300 may include a central processing unit 303 in data communication with memory 305 via a bus 308. Central processing unit 303 is an electronic circuit designed to obtain instructions, e.g. from memory 305, carry out the instructions, e.g. by performing the arithmetic, logical, control and input/output (I/O) operations specified by the instructions. Memory 305 generally comprises some or all of: random access memory (RAM), read-only memory (ROM), and/or a permanent mass storage device, such as a disk drive, flash memory, or the like. Bus 308 is a communication system that transfers data between components within relay station 300, and encompasses any related hardware components (wire, optical fiber, etc.) and software, including communication protocols; the data communications between various components of relay station 300 may be accomplished by wired and/or wireless connections.

Relay station 300 may also include a network interface 310 for connecting to a network such as network 103; one or more optional user input device(s) 313, e.g. an alphanumeric keyboard, keypad, a mouse or other pointing device, a touchscreen, and/or a microphone (or a user input port for connecting an external user input device); optional display 315 (or a display input port for connecting to an external display device); and the like, all interconnected, along with the network interface 310, to central processing unit 303 and memory 305 via bus 308. Relay station 300 may also include a proximate data signal receiver 318 for receiving proximate data signals from beacons, such as beacon 400A-F. In some embodiments, a relay station 300 may include more components than those shown in FIG. 3, such as a global positioning module. However, it is not necessary that these, generally conventional, components be shown in order to disclose an illustrative embodiment.

Memory 305 of exemplary relay station 300 may store program code, executable by central processing unit 303, corresponding to an operating system 323, as well as program code corresponding to a relay application 325. Operating system 323 and relay application 325 may be loaded into memory 305 via network interface 310 or via a computer readable storage medium 330, such as a hard-disk drive, a solid-state drive, an optical disc, a removable memory card, and/or the like.

In operation, operating system 323 manages the hardware and software resources of relay station 300 and provides common services and memory allocation for various software applications, such as relay application 325. For hardware functions such as network communications via network interface 310 and receiving data via proximate data signal receiver 318, operating system 323 acts as an intermediary between software executing on the relay station and the device's hardware.

Relay application 325 may be a software application for retrieving and processing proximal data signals received from one or more beacons 400 via proximal data signal receiver 318 and providing corresponding relay update messages to server 200 via network interface 310.

Although an exemplary relay station 300 has been described with hardware components that generally conforms to conventional general-purpose computing devices, a relay station may be any of a great number of devices capable of communicating with network 103, receiving proximal data signals, and executing instructions for performing relay application 325.

Exemplary Beacon

Figure 4:
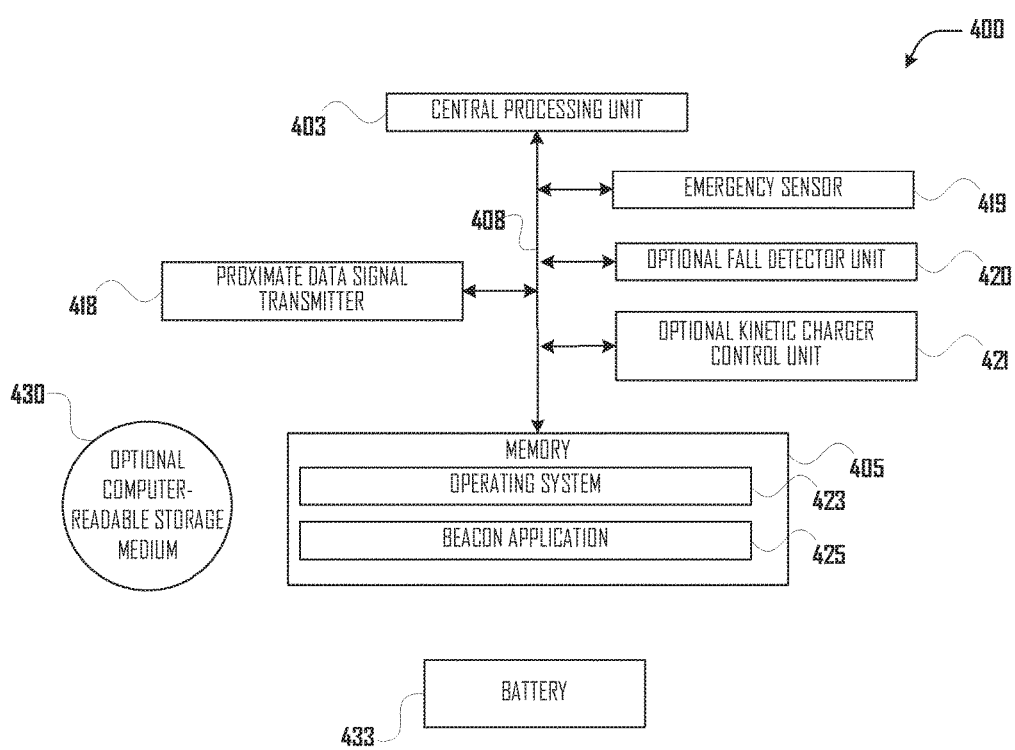
FIG. 4 illustrates several components of an exemplary beacon in accordance with at least one embodiment.

FIG. 4 illustrates several components of an exemplary beacon 400, such as any of beacons 400A-F. However, the present methods and systems do not depend on any particular internal configuration of a beacon.

As shown in FIG. 4, exemplary beacon 400 may include a central processing unit 403 in data communication with memory 405 via a bus 408. Central processing unit 403 is an electronic circuit designed to obtain instructions, e.g. from memory 405, carry out the instructions, e.g. by performing the arithmetic, logical, control and input/output (I/O) operations specified by the instructions. Memory 405 generally comprises some or all of: random access memory (RAM), read-only memory (ROM), and/or a permanent mass storage device, such as flash memory or the like. Bus 408 is a communication system that transfers data between components within relay station 400, and encompasses any related hardware components (wire, optical fiber, etc.) and software, including communication protocols; the data communications between various components of relay station 400 may be accomplished by wired and/or wireless connections.

Beacon 400 may also include proximate data signal transmitter 418 for transmitting a proximate data signal receivable by a proximate data signal receiver 318 of a relay station 300. Beacon 400 may also include one or more emergency sensor(s) 419, an optional fall detector unit 420, an optional kinetic charger control unit 421, and the like, all interconnected, along with the proximate data signal transmitter 418, to central processing unit 403 and memory 405 via bus 408. A power source 433 (e.g., battery, capacitor, or the like) may deliver operating power to various components of beacon 400. In some embodiments, beacon 400 may include more components than those shown in FIG. 4, such as a global positioning system module. However, it is not necessary that these, generally conventional, components be shown in order to disclose an illustrative embodiment.

Memory 405 of exemplary beacon 400 may store program code, executable by central processing unit 403, corresponding to an operating system 423, as well as program code corresponding to a beacon application 425. Operating system 423 and beacon application 425 may be loaded into memory 405 via a computer readable storage medium 430, such as a solid-state drive, an optical disc, a removable memory card, and/or the like.

In operation, operating system 423 manages the hardware and software resources of beacon 400 and provides common services and memory allocation for various software applications, such as beacon application 425. For hardware functions such as transmitting data via proximate data signal transmitter 418, operating system 423 acts as an intermediary between software executing on the relay station and the device's hardware.

Beacon application 425 may be a software application for monitoring emergency sensor(s) 419 proximal data signals received from one or more beacons 400 via proximal data signal receiver 418 and providing corresponding relay update messages to server 200 via network interface 410.

Although an exemplary beacon 400 has been described with hardware components that generally conforms to conventional general-purpose computing devices, a beacon may be any of a great number of devices capable of transmitting proximal data signals, and executing instructions for performing beacon application 425.

First Exemplary Deployment of the Present Proximal Physical Location Tracking and Management Systems and Methods FIGS. 5A-D illustrate a simplified, exemplary deployment 500 of the present proximal physical location tracking and management systems and methods.

Figure 5A:
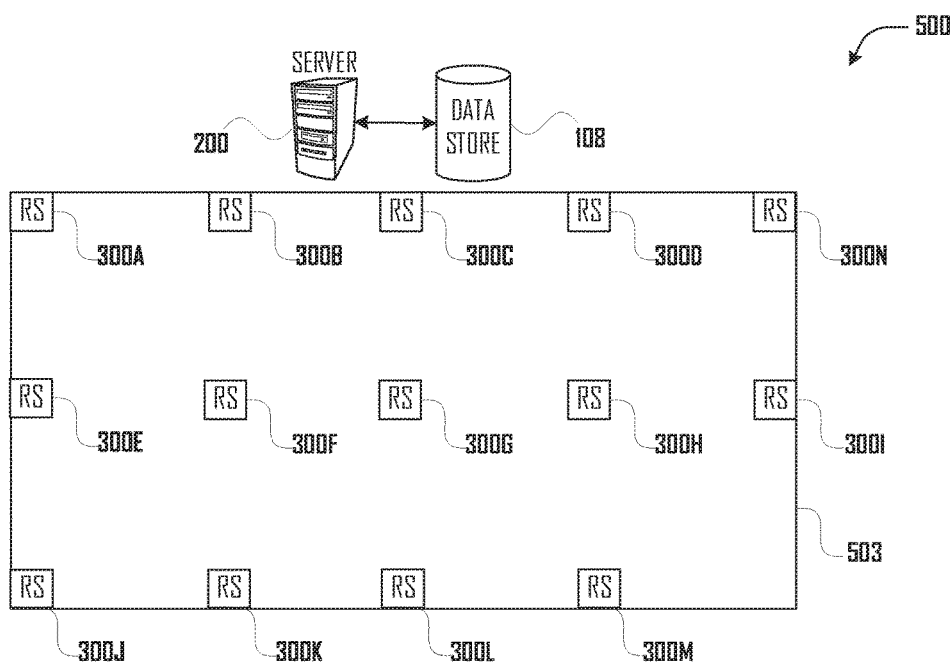
FIGS. 5A-F illustrate respective first through fifth states of an exemplary deployment of a proximal physical location tracking and management system in accordance with at least one embodiment overlaid over a deployment area.

Referring to FIG. 5A, a plurality of relay stations 300, such as relay stations 300A-N, may be installed at geophysical locations known relative to one another and relative to a deployment area 503, e.g. a secure facility and/or grounds such as a campus, hospital, school, prison, or the like. Each relay station 300 may be in data communication with a monitoring server 200. Monitoring server 200 is not required to be located in physical proximity to any of relay stations 300 and/or deployment area 503. Monitoring server 200 may be in data communication with a data store 108.

Figure 5B:
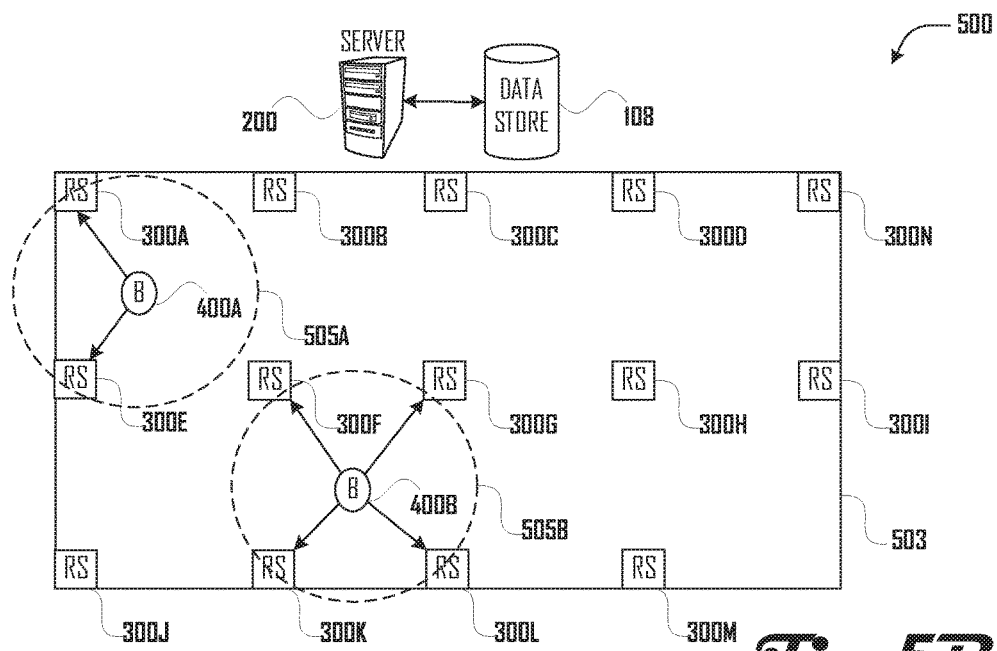

Referring to FIG. 5B, one or more beacons 400, such as beacons 400A-B, may be provided to individuals (not shown) located within deployment area 503. Each beacon 400 may broadcast a series of proximate data signals, which may represent a Bluetooth pairing request including a beacon identifier (e.g., MAC Address that is part of the hardware/protocol layer itself, and should not change) and a data payload. In one example embodiment, the payload contains five bytes comprising: Version (Version of the packet format), EmergencyFlag (either 0x00 or 0x01, based off if the beacon is in emergency mode or not, other value may be used for other signals). Battery+Battery (two bytes to contain the battery voltage in millivolts), Reserved (for possible expanded information in future versions). The manufacturer can be determined from the beacon identifier, which allows an application to know that the manufacturer data is in the formal displayed above. Other embodiments and/or manufacturers or version may contain different payloads and payload structures. Each beacon's proximate data signal has a limited maximum range 505. Each beacon 400 may be capable of operating in a standard operating mode and an emergency operating mode. In the standard operating mode, a beacon 400 may broadcast the proximate data signal at a standard frequency (e.g. one broadcast per second) and/or with a standard data payload. In the emergency operating mode, a beacon 400 may broadcast the proximate data signal at an emergency frequency (e.g. fifty broadcasts per second) and/or with an emergency data payload. The increased broadcast frequency may in some embodiments ensure that in an emergency operating mode the proximate data signal is more likely to be received.

A relay station 300 within limited maximum range 505 of a beacon's proximate data signal may receive the beacon's proximate data signal and provide a corresponding relay update message to monitoring server 200. The relay update message may include a beacon identifier associated with beacon 400 and monitoring server 200 may access records, e.g. in data store 108, associated with the beacon identifier and, e.g., determine whether beacon 400 is in standard or emergency operating mode, determine whether the beacon authorized to be in its current location relative to deployment area 503, and the like. Monitoring server may also detect an absence of expected relay update messages associated with a beacon, e.g. in the event a beacon is not in range of any relay station 300 within deployment area 503.

If a beacon 400 is in standard operating mode and is authorized to be in its current location, then monitoring server 200 may create a record of the presence of the beacon in its current location (and/or in the physical proximate area of the relevant relay(s)) at the time of the proximate data signal broadcast. If beacon 400 is in emergency operating mode and/or is not authorized to be in its current physical location, monitoring server 200 may provide an emergency notification, e.g. via display, audible alert, phone call, text message, push notification, and/or the like.

If the proximate data signal broadcast by beacon 400 is received by a single relay station 300, monitoring server 300 may determine a distance between the beacon and the relay station, e.g. by analyzing data relating to the strength of the proximate data signal. If the proximate data signal broadcast by beacon 400 is received by multiple relay station 300s, e.g. relay station 300A and relay station 300E, monitoring server 300 may determine a location of the beacon relative to the relay stations, e.g. by analyzing data relating to the comparative strength and/or timing of the proximate data signal as received by the relay stations.

In the example shown in FIGS. 5B-F, it is assumed records in data store 108 indicate beacon 400A is authorized to be anywhere within deployment area 503, but must remain within the deployment area and must not be in the proximate physical area of beacon 400B and indicate beacon 400B is authorized to be anywhere within deployment area 503, but must remain within the deployment area and must not be in the proximate physical area of beacon 400A.

As shown in FIG. 5B, relay station 300A and relay station 300E are within limited maximum range 505A of the proximate data signal broadcast by beacon 400A and relay station 300F, relay station 300G, relay station 300K, and relay station 300L are within limited maximum range 505B of the proximate data signal broadcast by beacon 400B. Relay station 300A and relay station 300E may receive the proximate data signal broadcast by beacon 400A and provide corresponding relay update messages (not shown) to monitoring server 200. Relay station 300F, relay station 300G, relay station 300K, and relay station 300L may receive the proximate data signal broadcast by beacon 400B and provide corresponding relay update messages (not shown) to monitoring server 200. Monitoring server 200 may determine beacon 400A and beacon 400B are in standard operating mode and are authorized to be in their current location relative to each other and deployment area 503.

Figure 5C:
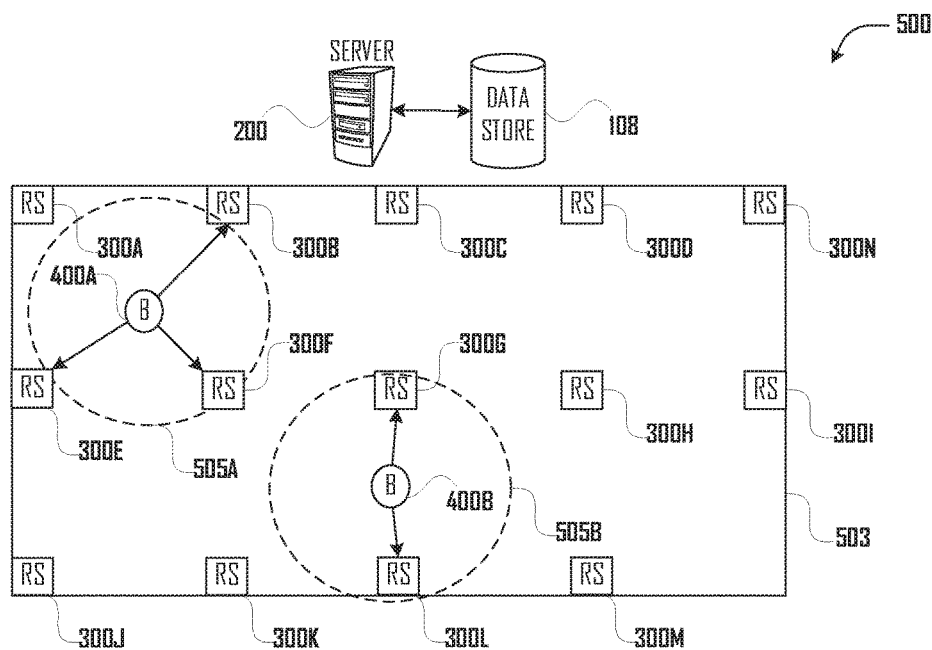

In FIG. 5C, beacon 400A and beacon 400B have moved within deployment area 503 relative to their position in FIG. 5B. Relay station 300B, relay station 300E, and relay station 300F are within limited maximum range 505A of the proximate data signal broadcast by beacon 400A and relay station 300O and relay station 300L are within limited maximum range 505B of the proximate data signal broadcast by beacon 400B. Proximate data signals broadcast from beacon 400A may be received by relay 300B, relay station 300E, and relay station 300F and proximate data signals broadcast from beacon 400B may be received by relay 300G and relay station 300L. Monitoring server 200 may determine beacon 400A and beacon 400B are in standard operating mode and are authorized to be in their current location relative to each other and deployment area 503.

Figure 5D:
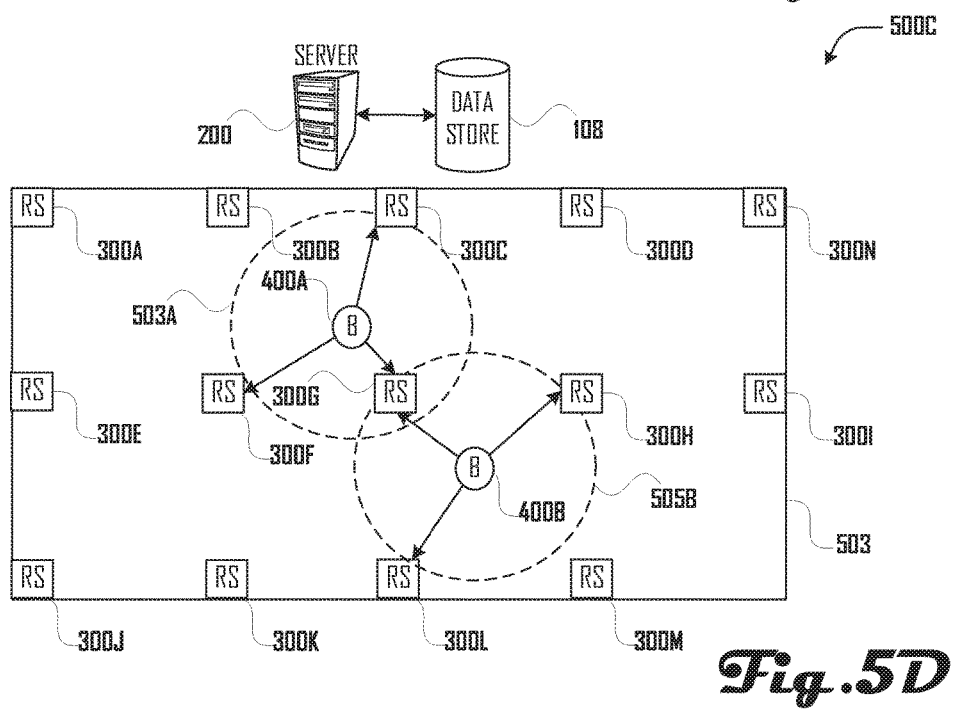

In FIG. 5D, beacon 400A and beacon 400B have moved within deployment area 503 relative to their position in FIG. 5C. Relay station 300C, relay station 300F, and relay station 300G are within limited maximum range 505A of the proximate data signal broadcast by beacon 400A and relay station 300G, relay station 300H, and relay station 300L, are within limited maximum range 505B of the proximate data signal broadcast by beacon 400B. Proximate data signals broadcast from beacon 400A may be received by relay 300C, relay station 300F, and relay station 300G and proximate data signals broadcast from beacon 400B may be received by relay station 300G, relay station 300H, and relay station 300L. Monitoring server 200 may determine beacon 400A and beacon 400B are in standard operating mode and are authorized to be in their current location relative to each other and deployment area 503.

Figure 5E:
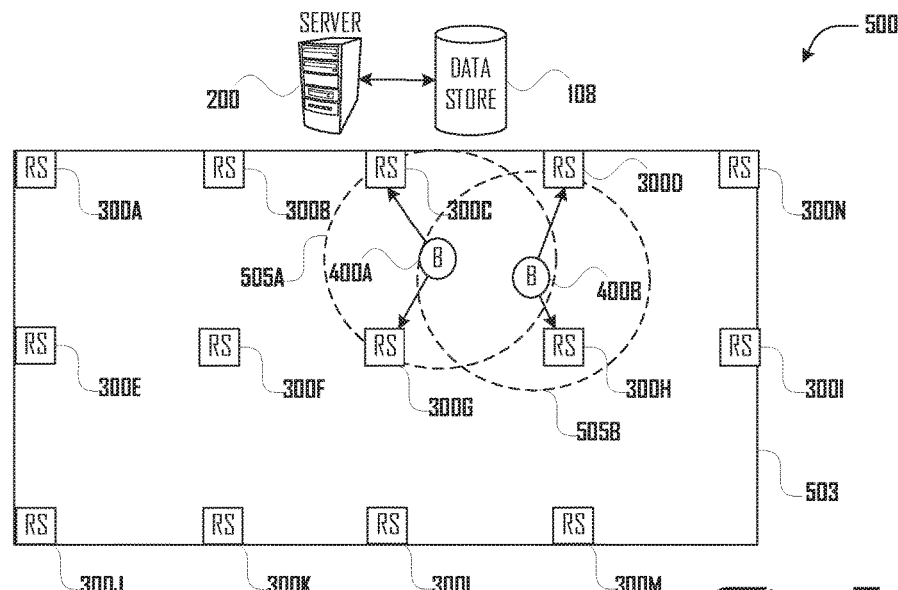

In FIG. 5E, beacon 400A and beacon 400B have moved within deployment area 503 relative to their position in FIG. 5D. Relay station 300C and relay station 300G are within limited maximum range 505A of the proximate data signal broadcast by beacon 400A and relay station 300D and relay station 300H are within limited maximum range 505B of the proximate data signal broadcast by beacon 400B. Proximate data signals broadcast from beacon 400A may be received by relay 300C and relay station 300G and proximate data signals broadcast from beacon 400B may be received by relay station 300D and relay station 300H. Monitoring server 200 may determine beacon 400A and beacon 400B are in standard operating mode and are authorized to be in their current location relative to deployment area 503 but are not authorized to be in their current location relative to each other. Monitoring server 200 may provide corresponding emergency notifications, e.g. via display, audible alert, phone call, text message, push notification, and/or the like.

Figure 5F:
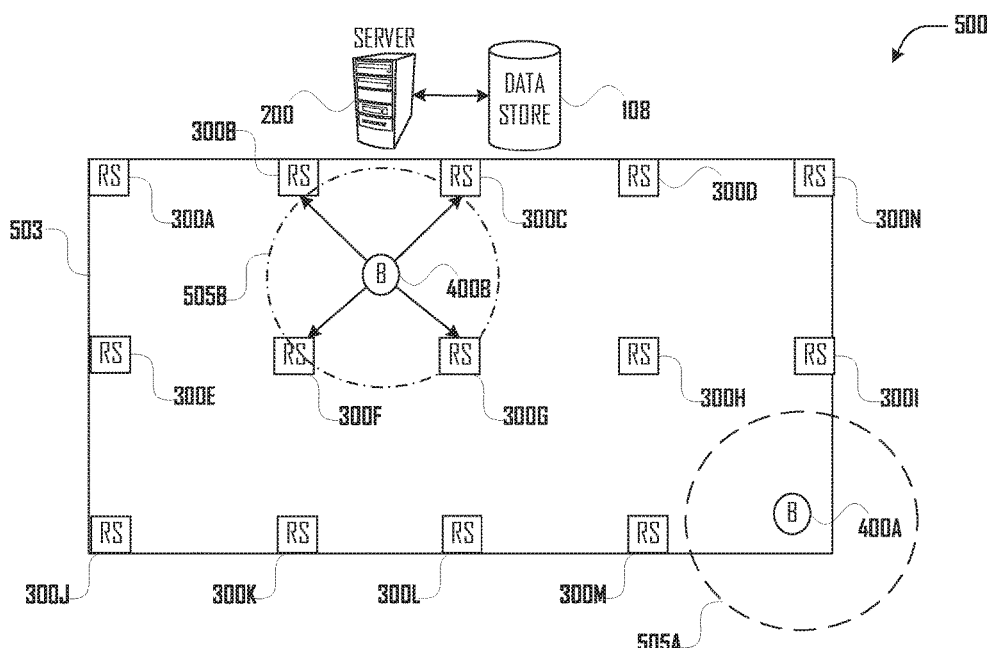

In FIG. 5F, beacon 400A and beacon 400B have moved within deployment area 503 relative to their position in FIG. 5E and beacon 400B is now operating in emergency operation mode (indicated by a dot-dash line). No relay stations are within limited maximum range 505A of the proximate data signal broadcast by beacon 400A and relay station 300B, relay station 300C, relay station 300F, and relay station 300G are within limited maximum range 505B of the proximate data signal broadcast by beacon 400B. Proximate data signals broadcast from beacon 400A are not received by any relay station and proximate data signals broadcast from beacon 400B may be received by relay station 300B, relay station 300C, relay station 300F, and relay station 300G. Monitoring server 200 may determine expected proximate data signals from beacon 400A have not been received and that beacon 400B is operating in emergency operation mode. Monitoring server 200 may provide corresponding emergency notifications, e.g. via display, audible alert, phone call, text message, push notification, and/or the like.

Figure 6A:
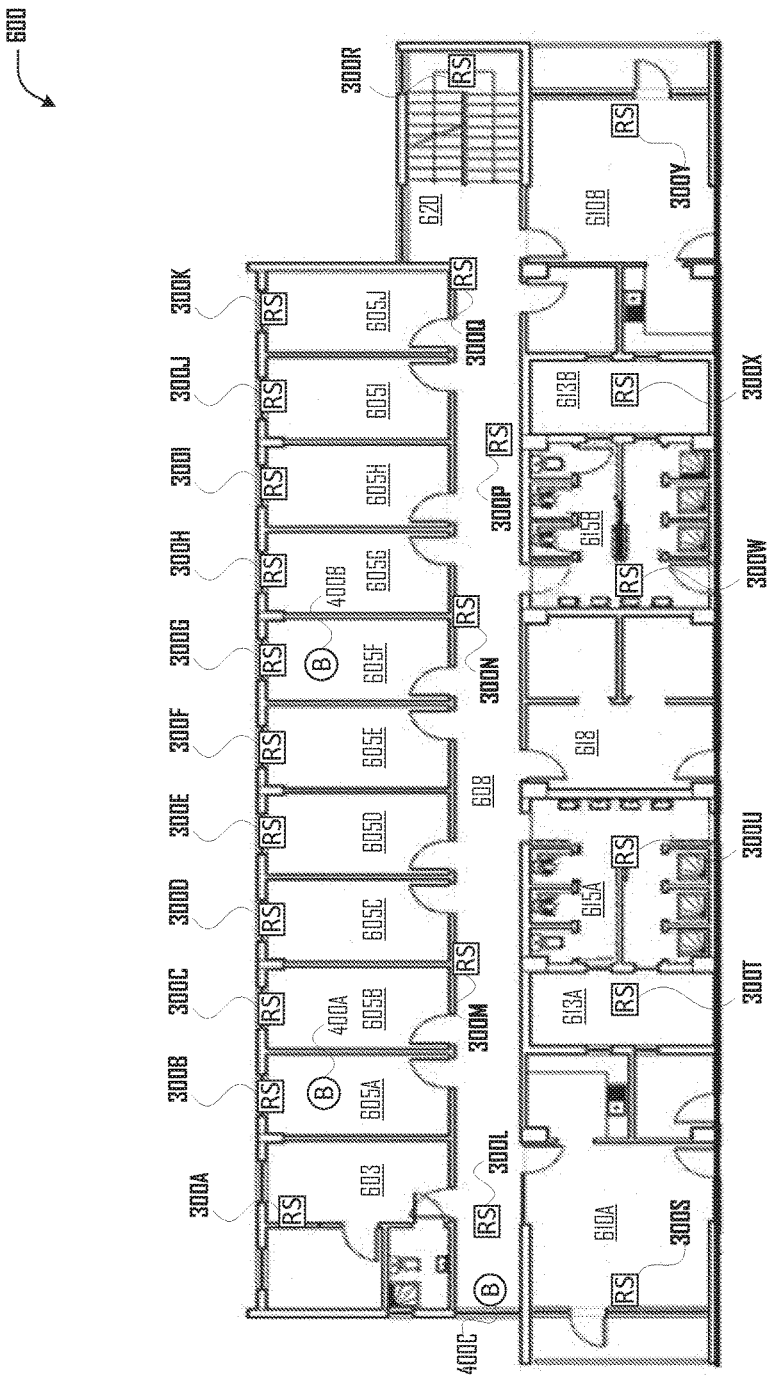

Second Exemplary Deployment of the Present Proximal Physical Location Tracking and Management Systems and Methods FIGS. 6A-B illustrate a floor plan 600 of a facility having a proximal physical location tracking and management system deployed therein.

Facility includes a restricted supervisor area 603, a plurality of private personal areas 605A-J, a common hallway 608, two common rooms 610A-B, two restricted storage areas 613A-B, two gender restricted areas (e.g. restrooms) 615A-B, a restricted office area 618, and a restricted stairway area 620.

In the illustrated embodiment, relay stations 300A-N, 300P-U, 300W-Y are installed in a manner such that:
Relay 300A may receive proximate data signals broadcast from a beacon physically present in restricted supervisor area 603;
Relay 300B-K may receive proximate data signals broadcast from a beacon physically present in respective private personal areas 605A-J;
Relay 300L-N and 300P-Q may receive proximate data signals broadcast from a beacon physically present in common hallway area 608;
Relay 300R may receive proximate data signals broadcast from a beacon physically present in restricted stairway area 620;
Relay 300S may receive proximate data signals broadcast from a beacon physically present in common room 610A;
Relay 300T may receive proximate data signals broadcast from a beacon physically present in restricted storage area 613A;
Relay 300U may receive proximate data signals broadcast from a beacon physically present in gender restricted area 615A;
Relay 300W may receive proximate data signals broadcast from a beacon physically present in gender restricted area 615B;
Relay 300X may receive proximate data signals broadcast from a beacon physically present in restricted storage area 613B; and
Relay 300Y may receive proximate data signals broadcast from a beacon physically present in common room 610B.

In the example illustrated in FIG. 6A, a beacon 400A is located in private personal area 605A. Proximate data signals broadcast from beacon 400A will be received by relay 300B. Relay 300B will provide corresponding relay update messages to a monitoring server (not shown). The monitoring server will determine whether beacon 400A is in standard or emergency operating mode and is authorized to be in private personal area 605A. If yes, monitoring server may simply create a record of the presence of beacon 400A in private personal area 605A (and/or in the physical proximate area of relay 300B) at the time of the proximate data signal broadcast. If not, the monitoring server may provide an emergency notification, e.g via display, audible alert, phone call, text message, push notification, and/or the like.

Similarly, a beacon 400B is located in private personal area 605F. Proximate data signals broadcast from beacon 400B will be received by relay 300G. Relay 300G will provide corresponding relay update messages to a monitoring server (not shown). The monitoring server will determine whether beacon 400B is in standard or emergency operating mode and is authorized to be in private personal area 605F If yes, monitoring server may simply create a record of the presence of beacon 400B in private personal area 605F (and/or in the physical proximate area of relay 300B) at the time of the proximate data signal broadcast. If not, the monitoring server may provide an emergency notification, e.g via display, audible alert, phone call, text message, push notification, and/or the like.

A beacon 400C is located in common hallway area 608. Proximate data signals broadcast from beacon 400C will be received by relay 300L. Relay 300L will provide corresponding relay update messages to a monitoring server (not shown). The monitoring server will determine whether beacon 400C is in standard or emergency operating mode and is authorized to be in common hallway area 608. If yes, monitoring server may simply create a record of the presence of beacon 400C in common hallway area 400C (and/or in the physical proximate area of relay 300L) at the time of the proximate data signal broadcast. If not, the monitoring server may provide an emergency notification, e.g via display, audible alert, phone call, text message, push notification, and/or the like.

Referring now to the example illustrated in FIG. 6B, beacon 400A and beacon 400C have moved to common room 610B. Proximate data signals broadcast from beacon 400A and 400C will be received by relay 300W. Relay 300W will provide corresponding relay update messages to a monitoring server (not shown). As described above, the monitoring server will determine whether either of beacons 400A-B are in standard or emergency operating mode and are authorized to be in common room 610B. The monitoring server may also determine whether there is a co-location restriction for beacons 400A and 400C, i.e. whether beacon 400A and beacon 400C are restricted from being in physical proximity to one another. In the event of such a co-location restriction, the monitoring server may provide an emergency notification, e.g via display, audible alert, phone call, text message, push notification, and/or the like.

Beacon 400B has moved to restricted office area 618. Proximate data signals broadcast from beacon 400B may not be received by any of relays 300A-N, 300P-U, 300W-Y. After a threshold amount of time has passed without receiving information regarding proximate data signals broadcast by beacon 400B, the monitoring server will may provide an emergency notification associated with beacon 400B, e.g via display, audible alert, phone call, text message, push notification, and/or the like.

A First Exemplary Series of Communications

Figure 7B:
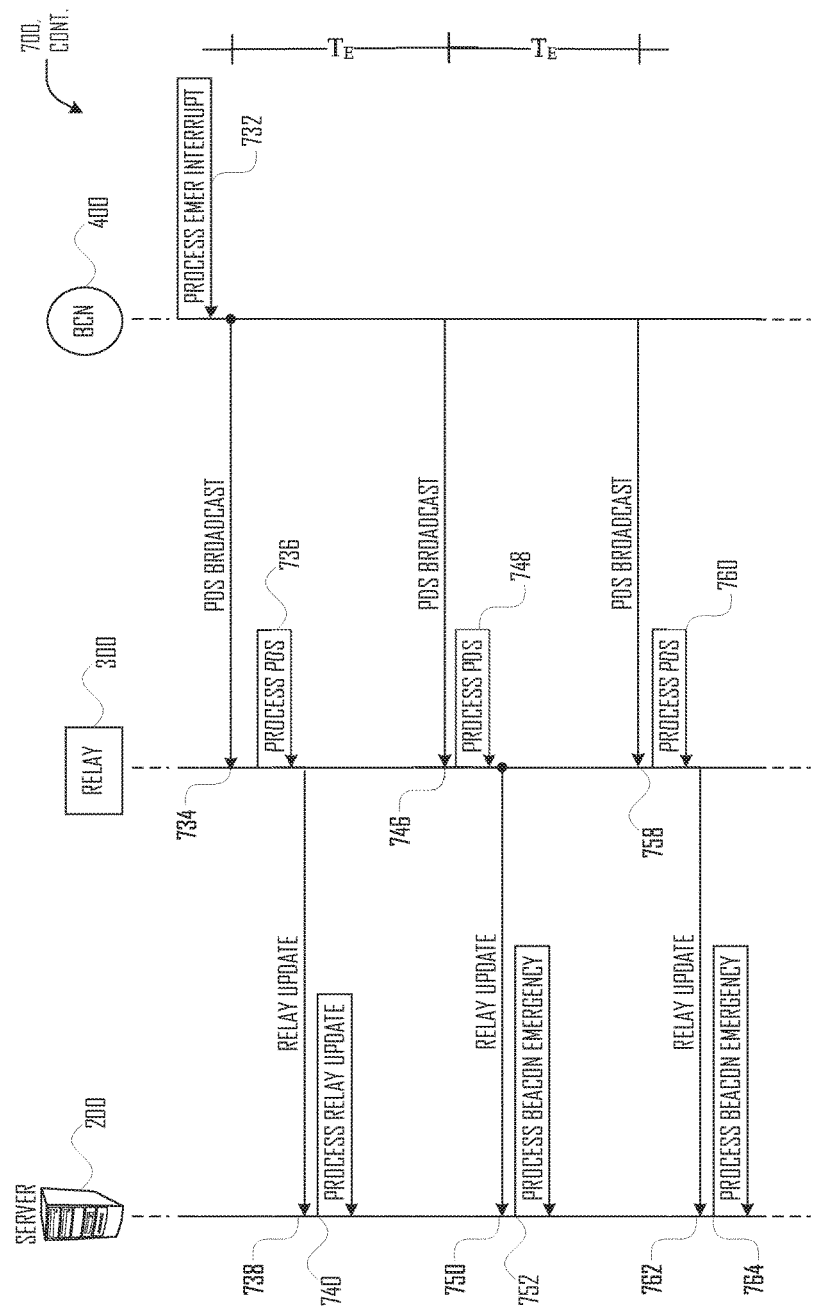

FIGS. 7A-C illustrates a first exemplary series of communications 700 between monitoring server 200, relay 300, and beacon 400 corresponding to simple example of standard and emergency operation of the present methods and systems. During standard operation, illustrated in FIG. 7A, beacon 400 may broadcast a proximate data signal via its proximate data signal transmitter 418 at a standard time interval $T_S$, which may be received by proximate data signal receiver 318 of relay 300. During emergency operation, illustrated in FIG. 7B, beacon 400 may broadcast a proximate data signal via its proximate data signal transmitter 418 at an emergency time interval $T_e$, which may be received by proximate data signal receiver 318 of relay 300. In both standard and emergency operation, relay 300 may provide a corresponding relay update message to monitoring server 200. Monitoring server 200 may monitor the delay between proximate data signals broadcast by beacon 400 and determine whether the beacon is operating in standard or emergency mode. As is shown in FIG. 7C, if beacon 400 is reset, thus causing the beacon to broadcast a proximate data signal at the standard interval, monitoring server 200 may continue to consider the beacon to be in emergency mode until the monitoring server obtains an emergency termination request from an authorized source, such as the monitoring server's optional user input 215.

Referring to FIG. 7A, monitoring server 200 may initialize 702; relay 300 may initialize 704; beacon 400 may initialize 706.

Beacon 400 may transmit a proximate data signal 708 that is received by relay 300.

Relay 300 may process 710 the proximate data signal 708 and provide a relay update message 712 to monitoring server 200.

Monitoring server 200 may process 714 relay update message 712.

A time $T_S$ after the transmission of proximate data signal 708, beacon 400 may transmit a proximate data signal 720 that is received by relay 300.

Relay 300 may process 722 proximate data signal 720 and provide a relay update message 724 to monitoring server 200.

The proximate data signal transmissions from beacon 200 may repeat at a standard interval $T_S$ until interrupted.

Monitoring server 200 may process 726 relay update message 724.

Referring now to FIG. 7B, sometime later beacon 400 may process an emergency interrupt 732.

Beacon 400 may then transmit a proximate data signal 734 that is received by relay 300.

Relay 300 may process 736 proximate data signal 734 and provide a relay update message 738 to monitoring server 200.

Monitoring server 200 may process 740 relay update message 738 and register a beacon emergency associated with beacon 400.

A time $T_E$ after the transmission of proximate data signal 734, beacon 400 may transmit a proximate data signal 746 that is received by relay 300.

Relay 300 may process 748 proximate data signal 746 and provide a relay update message 750 to monitoring server 200.

Monitoring server 200 may process 752 relay update message 750 and register a beacon emergency associated with beacon 400.

A time $T_E$ after the transmission of proximate data signal 746, beacon 400 may transmit a proximate data signal 758 that is received by relay 300.

Relay 300 may process 760 proximate data signal 758 and provide a relay update message 762 to monitoring server 200.

Monitoring server 200 may process 764 relay update message 762 and register a beacon emergency associated with beacon 400.

The proximate data signal transmissions from beacon 400 may repeat at an emergency interval $T_E$ until interrupted.

Referring now to FIG. 7C, sometime later beacon 400 may process a reset interrupt 766.

Beacon 400 may then transmit a proximate data signal 768 that is received by relay 300.

Relay 300 may process 770 proximate data signal 768 and provide a relay update message 772 to monitoring server 200.

Monitoring server 200 may process 774 relay update message 772 and register a beacon emergency associated with beacon 400

A time $T_S$ after the transmission of proximate data signal 768, beacon 400 may transmit a proximate data signal 780 that is received by relay 300.

Relay 300 may process 782 proximate data signal 780 and provide a relay update message 784 to monitoring server 200.

Monitoring server 200 may process 786 relay update message 784 and maintain the beacon emergency associated with beacon 400.

Sometime later, monitoring server 200 may process 788 an emergency termination request associated with beacon 400 at which point monitoring server 200 may terminate the emergency associated with beacon 400.

A Second Exemplary Series of Communications

Figure 8:
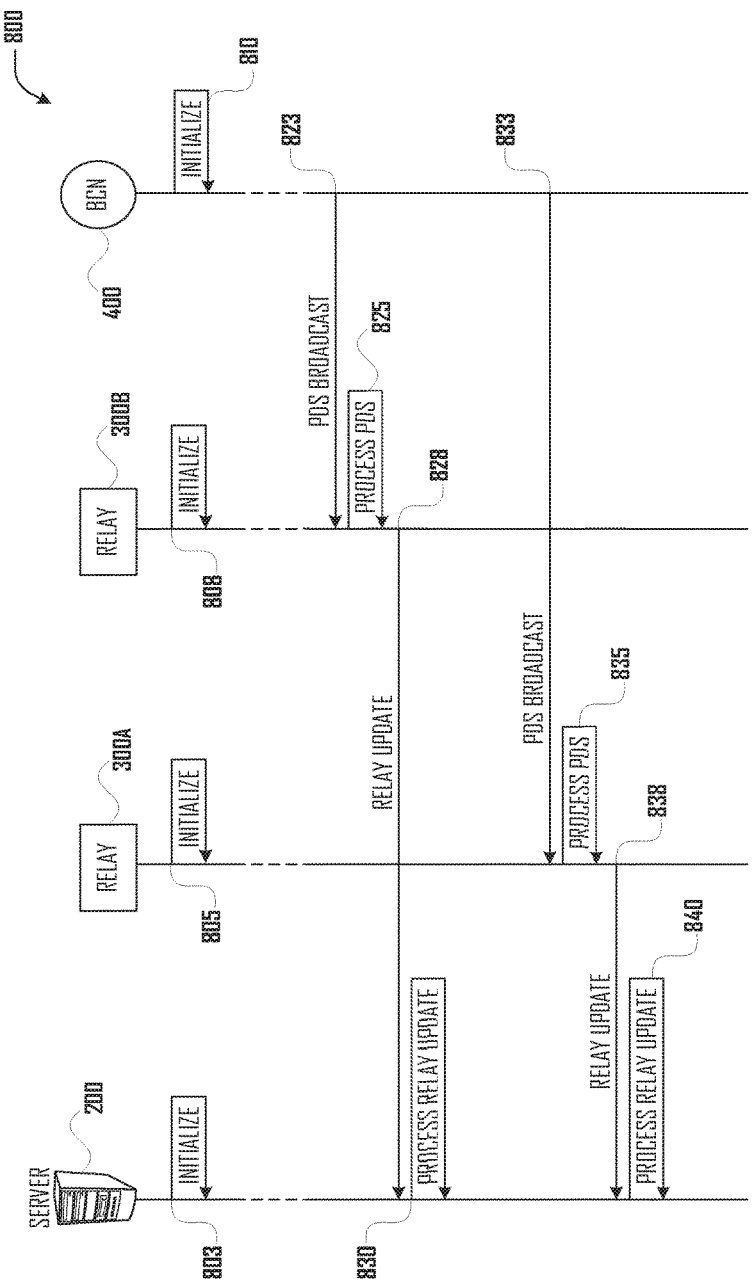
FIG. 8 illustrates a second exemplary series of communications between various devices in accordance with at least one embodiment.

FIG. 8 illustrates a second exemplary series of communications 800 between monitoring server 200, relay 300A, relay 300B, and beacon 400 corresponding to simple example of standard operation of the present methods and systems when beacon 400 physically moves from the physical proximate area of relay 300B to the physical proximate area of relay 300A.

Monitoring server 200 may initialize 803; relay 300A may initialize 805; relay 300B may initialize 808; and beacon 400 may initialize 810.

Sometime later, during standard or emergency operation, beacon 400 may broadcast a proximate data signal 823 that is received by relay 300B.

Relay 300B may process 825 proximate data signal 823 and provide a relay update message 828 to monitoring server 200.

Monitoring server 200 may process 830 relay update message 828.

Beacon 400 may transmit a proximate data signal 833 that is received by relay 300A.

Relay 300A may process 835 proximate data signal 833 in provide a relay update message 838 to monitoring server 200.

Monitoring server 200 may process 840 relay update message 838. For example, monitoring server 200 may determine whether beacon 400 is authorized to be in the physical area proximate to relay 300A and, if not, register a beacon emergency associated with beacon 400; monitoring server 200 may log and/or flag the transition of beacon 400 from the physical area proximate to relay 300B to the physical area proximate to relay 300A; and the like.

A Third Exemplary Series of Communications

Figure 9:
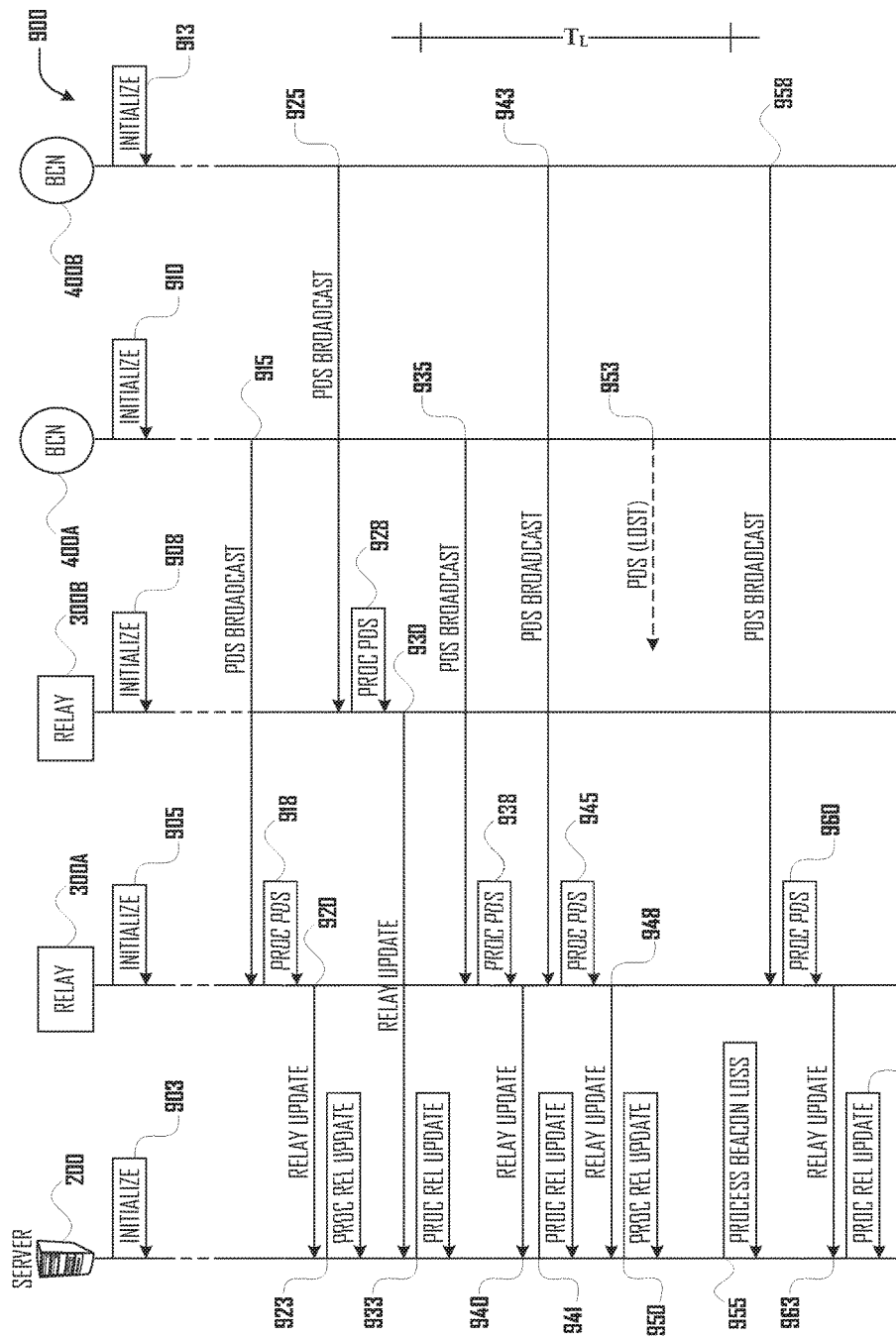
FIG. 9 illustrates a third exemplary series of communications between various devices in accordance with at least one embodiment.

FIG. 9 illustrates a third exemplary series of communications 900 between monitoring server 200, relay 300A, relay 300B, beacon 400A, and beacon 400B corresponding to simple example of standard operation of the present methods and systems when beacon 400B physically moves from the physical proximate area of relay 300B to the physical proximate area of relay 300A and when the proximate data signal broadcast by beacon 400A is not received by either or relays 300A-B.

Monitoring server 200 may initialize 903; relay 300A may initialize 905; relay 300B may initialize 908; beacon 400A may initialize 910; and beacon 400B may initialize 913.

Sometime later, beacon 400A may transmit a proximate data signal 915 that is received by relay 300A.

Relay 300A may process 918 proximate data signal 915 and provide a relay update message 920 to monitoring server 200.

Monitoring server 200 may process 923 relay update message 920.

Beacon 400B may transmit a proximate data signal 925 that is received by relay 300B.

Relay 300B may process 928 proximate data signal 925 and provide a relay update message 930 to monitoring server 200.

Monitoring server 200 may process 933 relay update message 930.

Beacon 400A may transmit a proximate data signal 935 that is received by relay 300A.

Relay 300A may process 938 proximate data signal 935 and provide a relay update message 940 to monitoring server 200.

Monitoring server 200 may process 941 relay update message 940.

Beacon 400B may transmit a proximate data signal 943 that is received by relay 300A.

Relay 300A may process 945 proximate data signal 943 and provide a relay update message 948 to monitoring server 200.

Monitoring server 200 may process 950 relay update message 948. For example, monitoring server 200 may determine whether beacon 400 is authorized to be in the physical area proximate to relay 300A and, if not, register a beacon emergency associated with beacon 400; monitoring server 200 may log and/or flag the transition of beacon 400 from the physical area proximate to relay 300B to the physical area proximate to relay 300A; and the like.

Beacon 400A may transmit a proximate data signal 953 that is not received by relay 300A, relay station 300B; proximate data signal 953 is lost.

At some time $T_L$ after beacon 400A transmitted proximate data signal 935, having not received intervening notice of a proximate data signal being received by either relay station 300A or relay station 300B, monitoring server 200 may process a beacon loss event 955 associated with beacon 400A.

Beacon 400A may transmit a proximate data signal 958 that is received by relay 300A.

Relay 300A may process 960 proximate data signal 958 and provide a relay update message 963 to monitoring server 200.

Monitoring server 200 may process 965 relay update message 963.

A Fourth Exemplary Series of Communications

Figure 10:
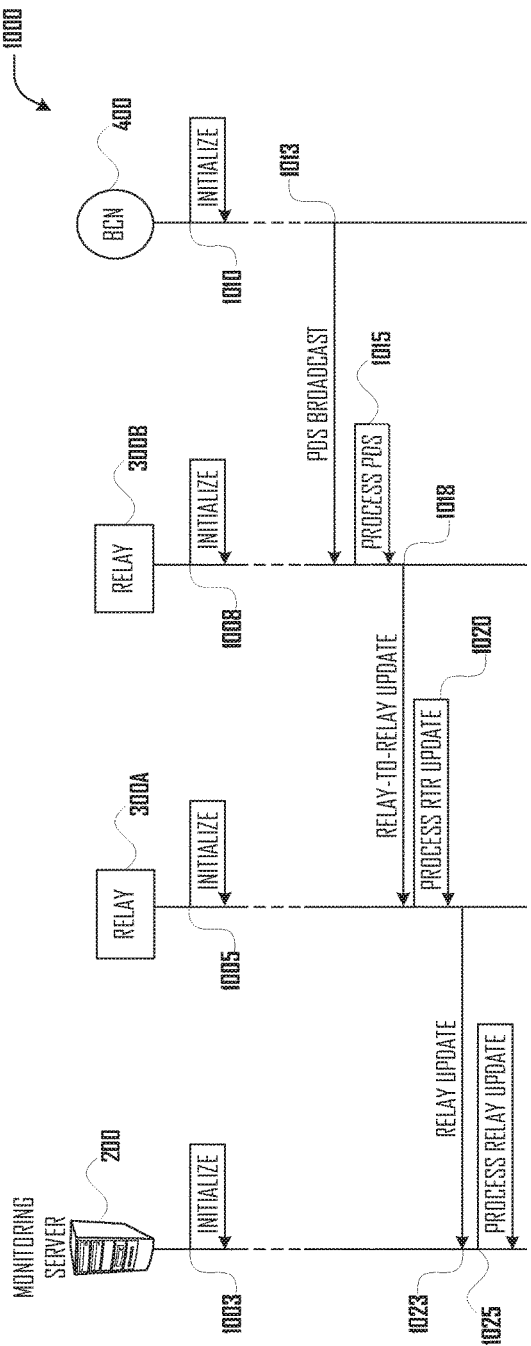
FIG. 10 illustrates a fourth exemplary series of communications between various devices in accordance with at least one embodiment.

FIG. 10 illustrates a fourth exemplary series of communications 1000 between monitoring server 200, relay 300A, relay 300B, and beacon 400 corresponding to simple example of standard operation of the present methods and systems when relay 300B is not in direct data communication with the monitoring server and therefore relay 300A acts as an intermediary between relay 300B and the monitoring server.

Monitoring server 200 may initialize 1003; relay 300A may initialize 1005; relay 300B may initialize 1008; and beacon 400 may initialize 1010.

Beacon 400 may provide a proximate data signal 1013 that is received by relay 300B.

Relay 300B may process 1015 proximate data signal 1013 and provide a relay-to-relay update message 1018 to relay 300A, e.g. via a secondary network.

Relay 300A may process 1020 relay-to-relay update message 1018 and provide a relay update message 1023 to monitoring server 200.

Monitoring server 200 may process 1025 relay update message 1023.

A First Exemplary Beacon Broadcast Routine

Figure 11A:
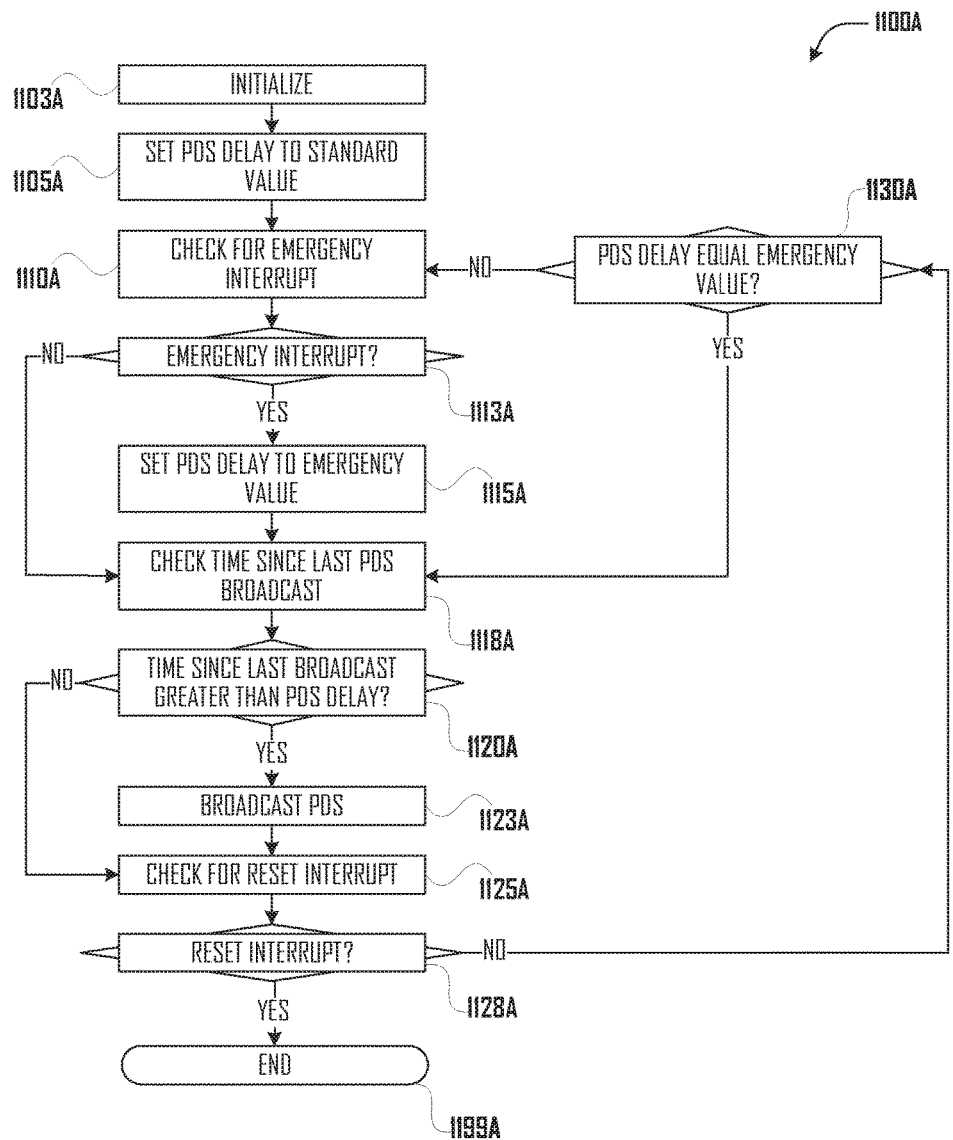
FIGS. 11A-B illustrates a flow diagrams of first and second exemplary beacon broadcast routines in accordance with various embodiments.

FIG. 11A illustrates a first exemplary beacon broadcast routine 1100A. Beacon broadcast routine 1100A may represent a portion of the functionality of beacon application 425 being executed by central processing unit 403 of beacon 400 in cooperation with various other hardware and software components of the present methods and systems.

Beacon broadcast routine 1100A may initialize at execution block 1103A.

Beacon broadcast routine 1100A may set a proximate data signal ("PDS") delay to a standard value at execution block 1105A.

Beacon broadcast routine 1100A may check for an emergency interrupt at execution block 1110A.

At decision block 1113A, if an emergency interrupt is obtained, then beacon broadcast routine 1100A may proceed to execution block 1115A; otherwise, beacon broadcast routine 1100A may proceed to decision block 1120A.

Beacon broadcast routine 1100A may set the PDS delay to an emergency value at execution block 1115A.

Beacon broadcast routine 1100A may check the amount of time since the beacon's last proximate data signal broadcast at execution block 1118A.

At decision block 1120A, if the amount of time since the beacon's last proximate data signal broadcast is greater than the PDS delay, then beacon broadcast routine 1100A may proceed to execution block 1123A; otherwise, beacon broadcast routine 1100A may proceed to decision block 1125A.

Beacon broadcast routine 1100A may cause the beacon to broadcast a proximate data signal at execution block 1123A.

Beacon broadcast routine 1100A may check for a reset interrupt at execution block 1125A.

At decision block 1128A, if a reset interrupt is obtained, then beacon broadcast routine 1100A may proceed to termination block 1199A; otherwise, beacon broadcast routine 1100A may proceed to decision block 1130A.

At decision block 1130A, if the PDS delay equals the emergency value, then beacon broadcast routine 1100A may loop back to execution block 1118A; otherwise, beacon broadcast routine 1100A may loop back to execution block 1110A.

Beacon broadcast routine 1100A may end at termination block 1199A.

A Second Exemplary Beacon Broadcast Routine

Figure 11B:
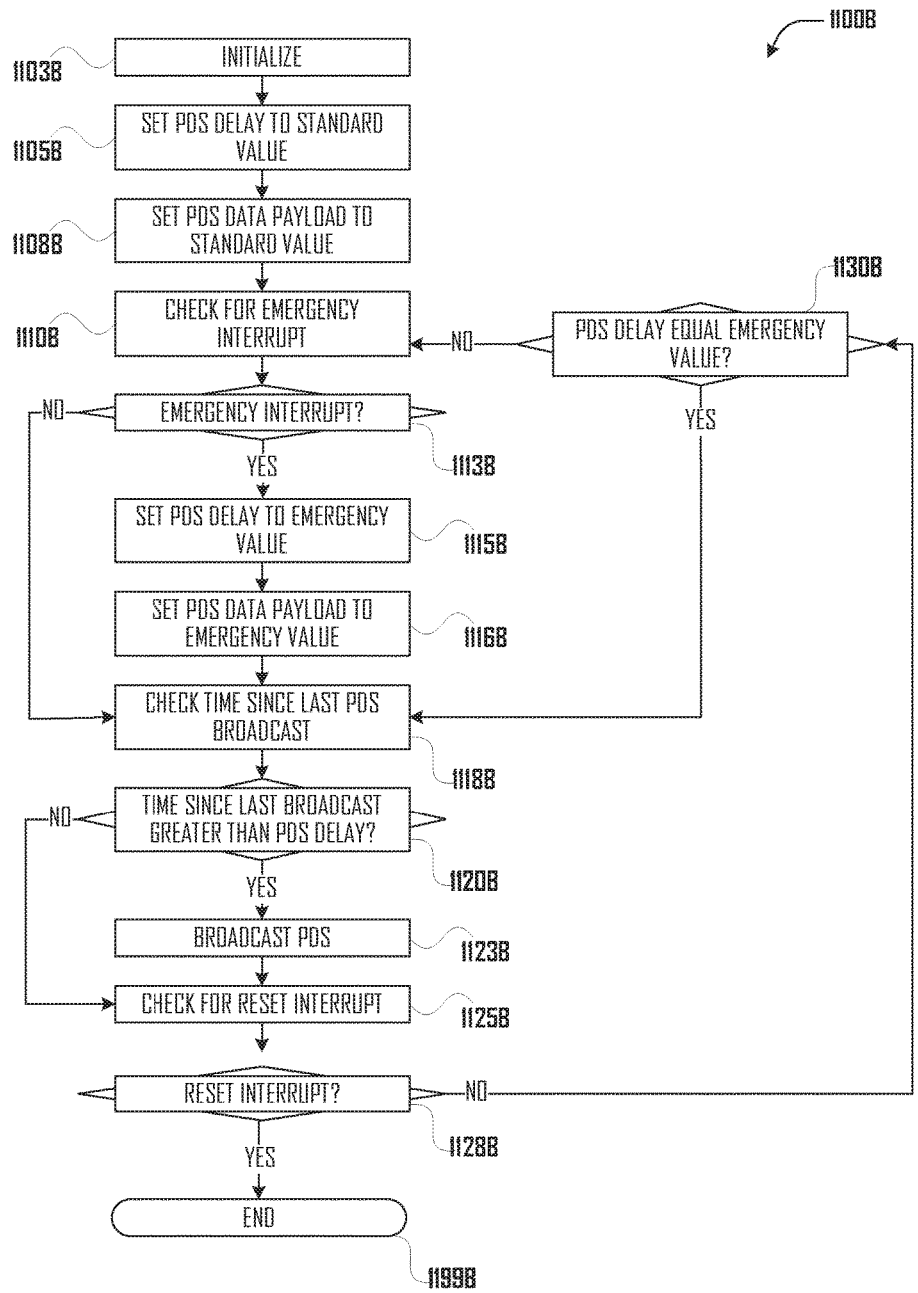

FIG. 11B illustrates a second exemplary beacon broadcast routine 1100B. Beacon broadcast routine 1100B may represent a portion of the functionality of beacon application 425 being executed by central processing unit 403 of beacon 400 in cooperation with various other hardware and software components of the present methods and systems. Beacon broadcast routine 1100B is similar to beacon broadcast routine 1100A, however, instead of indicating an emergency by only altering the PDS delay value, beacon broadcast routine 1100B indicates an emergency by altering the PDS delay value as well as the payload of the proximate data signal.

Beacon broadcast routine 1100B may initialize at execution block 1103B.

Beacon broadcast routine 1100B may set a proximate data signal ("PDS") delay to a standard value at execution block 1105B.

Beacon broadcast routine 1100B may set a PDS data payload to a standard value at execution block 1108B.

Beacon broadcast routine 1100B may check for an emergency interrupt at execution block 1110B.

At decision block 1113B, if an emergency interrupt is obtained, then beacon broadcast routine 1100B may proceed to execution block 1115B; otherwise, beacon broadcast routine 1100B may proceed to decision block 1120B.

Beacon broadcast routine 1100B may set the PDS delay to an emergency value at execution block 1115B.

Beacon broadcast routine 1100B may set the PDS data payload to an emergency value at execution block 1116B.

Beacon broadcast routine 1100B may check the amount of time since the beacon's last proximate data signal broadcast at execution block 1118B.

At decision block 1120B, if the amount of time since the beacon's last proximate data signal broadcast is greater than the PDS delay, then beacon broadcast routine 1100B may proceed to execution block 1123B; otherwise, beacon broadcast routine 1100B may proceed to decision block 1125B.

Beacon broadcast routine 1100B may cause the beacon to broadcast a proximate data signal at execution block 1123B.

Beacon broadcast routine 1100B may check for a reset interrupt at execution block 1125B.

At decision block 1128B, if a reset interrupt is obtained, then beacon broadcast routine 1100B may proceed to termination block 1199B; otherwise, beacon broadcast routine 1100B may proceed to decision block 1130B.

At decision block 1130B, if the PDS delay equals the emergency value, then beacon broadcast routine 1100B may loop back to execution block 1118B; otherwise, beacon broadcast routine 1100B may loop back to execution block 1110B.

Beacon broadcast routine 1100B may end at termination block 1199B.

An Exemplary Beacon Monitoring Routine

Figure 12:
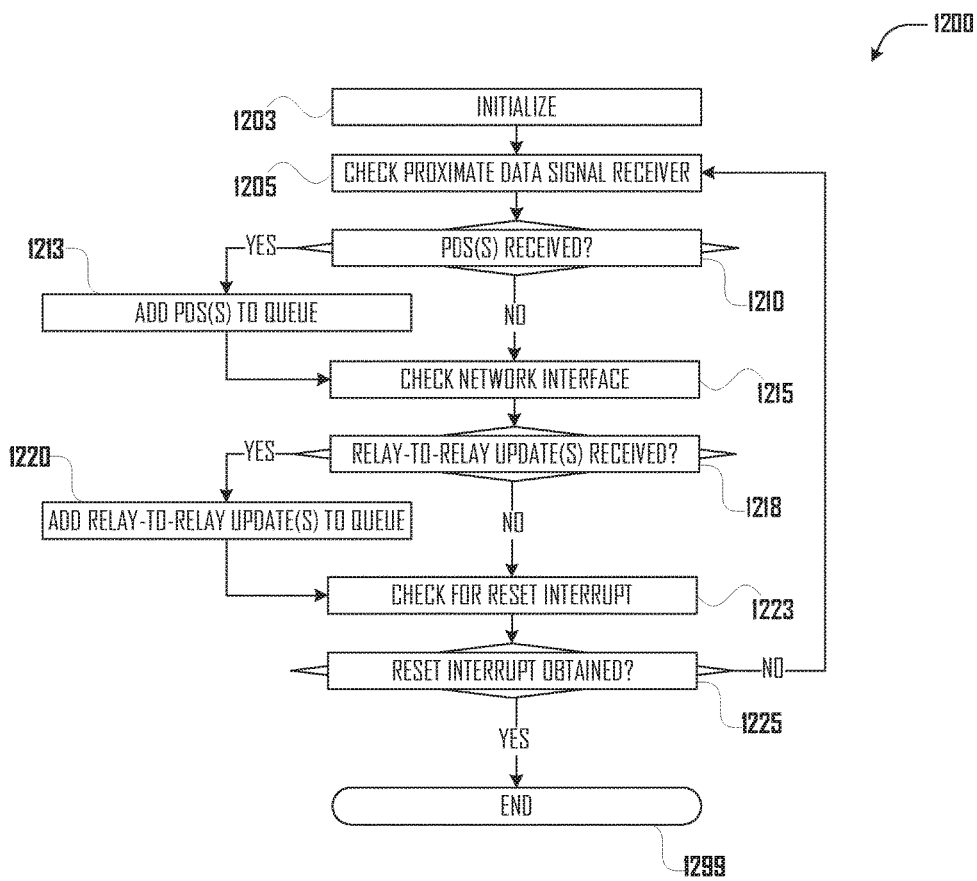
FIG. 12 illustrates a flow diagram of an exemplary beacon monitoring routine in accordance with at least one embodiment.

FIG. 12 illustrates an exemplary beacon monitoring routine 1200. Beacon monitoring routine 1200 may represent a portion of the functionality of relay application 325 being executed by central processing unit 303 of relay 300 in cooperation with various other hardware and software components of the present methods and systems.

Beacon monitoring routine 1200 may initialize at execution block 1203.

Beacon monitoring routine 1200 may check the relay's proximate data signal receiver at execution block 1205.

At decision block 1210, if a proximate data signal has been received, then beacon monitoring routine 1200 may proceed to execution block 1213; otherwise, beacon monitoring routine 1200 may proceed to execution block 1215.

Beacon monitoring routine 1200 may add any received proximate data signal to a beacon update queue at execution block 1213.

Beacon monitoring routine 1200 may check the relay's network interface at execution block 1215.

At decision block 1218, if a relay-to-relay update message has been obtained, then beacon monitoring routine 1200 may proceed to execution block 1220; otherwise, beacon monitoring routine 1200 may proceed to execution block 1223.

Beacon monitoring routine 1200 may add any obtained relay-to-relay update messages to the beacon update queue at execution block 1220.

Beacon monitoring routine 1200 may check for a reset interrupt at execution block 1223.

At decision block 1225, if a reset interrupt is obtained, then beacon monitoring routine 1200 may proceed to termination block 1299; otherwise, beacon monitoring routine 1200 may loop back to execution block 1205.

Beacon monitoring routine 1200 may end at termination block 1299.

An Exemplary Relay Update Routine

Figure 13:
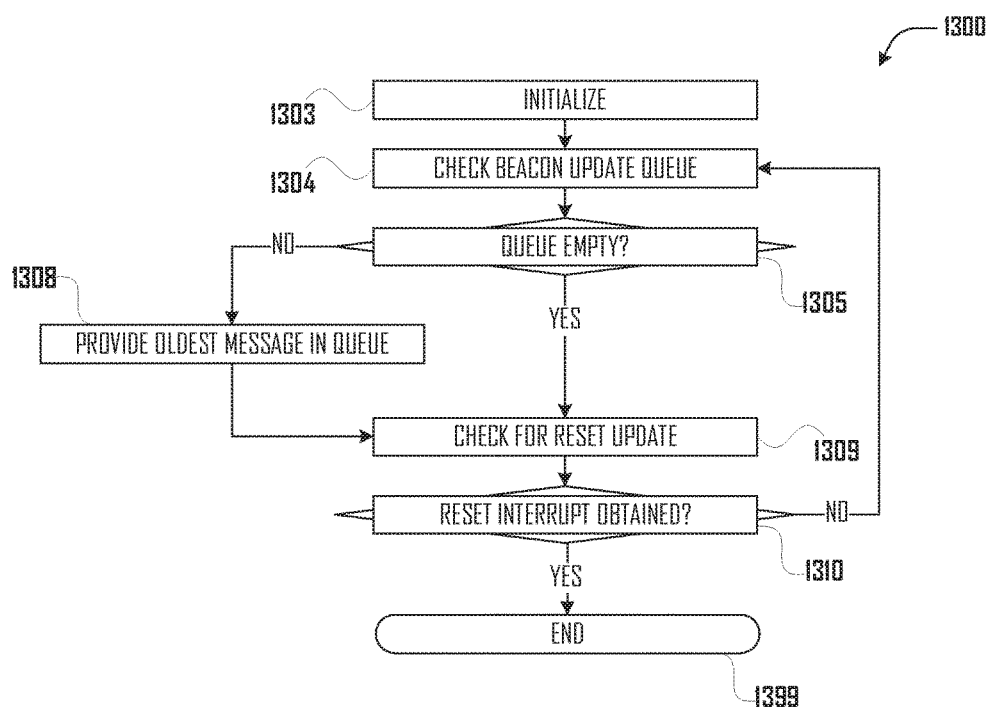
FIG. 13 illustrates a flow diagram of an exemplary relay update routine in accordance with at least one embodiment.

FIG. 13 illustrates an exemplary relay update routine 1300. Relay update routine 1300 may represent a portion of the functionality of relay application 325 being executed by central processing unit 303 of relay 300 in cooperation with various other hardware and software components of the present methods and systems.

Relay update routine 1300 may initialize at execution block 1303.

Relay update routine 1300 may check the beacon update queue at execution block 1304.

At decision block 1305, if the beacon update queue is empty, then relay update routine 1300 may proceed to execution block 1309; otherwise, relay update routine 1300 may proceed to execution block 1308.

Relay update routine 1300 may provide the oldest message in the beacon update queue at execution block 1308.

Relay update routine 1300 may check for a reset direct at execution block 1309.

At decision block 1310, if a reset interrupt is obtained, then relay update routine 1300 may proceed to termination block 1399; otherwise, relay update routine 1300 may loop back to execution block 1304.

Relay update routine 1300 may end at termination block 1399.

An Exemplary Relay Monitoring Routine

Figure 14:
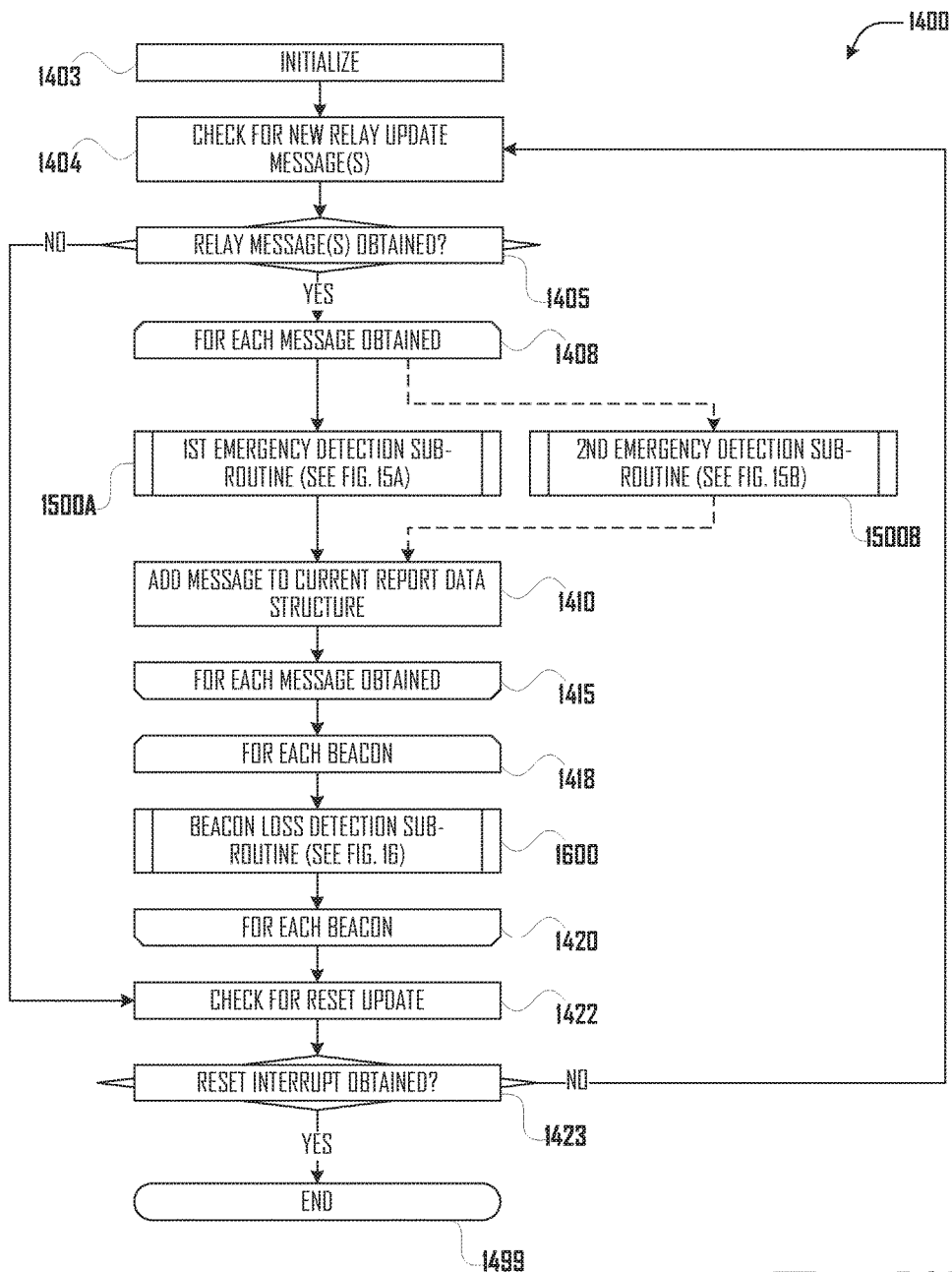
FIG. 14 illustrates a flow diagram of an exemplary relay monitoring routine in accordance with at least one embodiment.

FIG. 14 illustrates an exemplary relay monitoring routine 1400. Relay monitoring routine 1400 may represent a portion of the functionality of beacon monitoring service 225A being executed by central processing unit 203 of monitoring server 200 in cooperation with various other hardware and software components of the present methods and systems.

Relay monitoring routine 1400 may initialize at execution block 1403.

Relay monitoring routine 1400 may check for new relay update messages at execution block 1404.

At decision block 1405, if one or more new relay update messages are obtained, then relay monitoring routine 1400 may proceed to starting loop block 1408; otherwise, relay monitoring routine 1400 may proceed to execution block 1422.

At starting loop block 1408, relay monitoring routine 1400 may process each relay update message in turn.

Relay monitoring routine 1400 may call a first emergency detection sub-routine 1500A, described below with reference to FIG. 15A. In some embodiments, relay monitoring routine 1400 may call a second emergency detection sub-routine 1500B, described below with reference to FIG. 15B.

Relay monitoring routine 1400 may add the current message to a report data structure at execution block 1410.

At ending loop block 1415, relay monitoring routine 1400 may loopback to starting loop block 1408 to process the next relay update message, if any.

At starting loop block 1418, relay monitoring routine 1400 may process the beacon identifiers associated with each currently active beacon in turn.

Relay monitoring routine 1400 may call a beacon loss detection sub-routine 1600, described below with reference to FIG. 16.

At ending loop block 1420, relay monitoring routine 1400 may loopback to starting loop block 1418 process the next beacon identifier, if any.

Relay monitoring routine 1400 may check for a reset interrupt at execution block 1422.

At decision block 1423, if a reset interrupt is obtained, then relay monitoring routine 1400 may proceed to termination block 1499; otherwise, relay monitoring routine 1400 may loopback to execution block 1404.

Relay monitoring routine 1400 may end at termination block 1499.

A First Exemplary Emergency Detection Sub-Routine

Figure 15A:
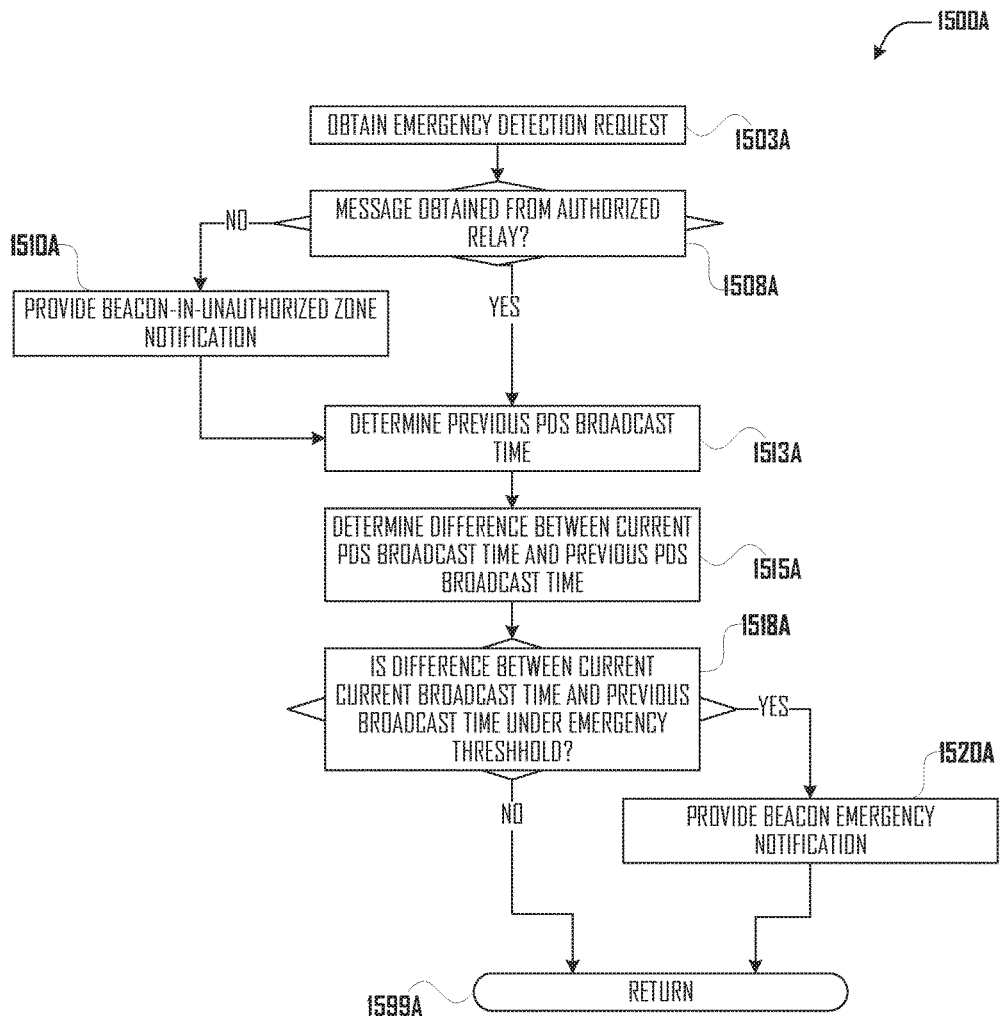
FIGS. 15A-B illustrates a flow diagram of an exemplary emergency detection sub-routine in accordance with various embodiments.

FIG. 15A illustrates a first exemplary emergency detection sub-routine 1500A. Emergency detection sub-routine 1500A may represent a portion of the functionality of beacon monitoring service 225A being executed by central processing unit 203 of monitoring server 200 in cooperation with various other hardware and software components of the present methods and systems.

Emergency detection sub-routine 1500A may obtain an emergency detection request at execution block 1503A. The emergency detection request may, for example, include a beacon identifier, a relay identifier, a current proximate data signal transmission time, and the like.

At decision block 1508A, if the relay identifier included in the emergency detection request corresponds to an authorized relay identifier, then emergency detection sub-routine 1500A may proceed to execution block 1513A; otherwise, emergency detection sub-routine 1500A may proceed to execution block 1510A.

Emergency detection sub-routine 1500A may provide a beacon-in-unauthorized zone notification at execution block 1510A.

Emergency detection sub-routine 1500A may determine a previous data signal broadcast time associated with the beacon identifier at execution block 1513A.

Emergency detection sub-routine 1500A may determine a difference between the current proximate data signal broadcast time and the previous proximate data signal broadcast time at execution block 1515A.

At decision block 1518A, if the difference between the current proximate data signal transition time and the previous proximate data signal transition time less than an emergency threshold value, then emergency detection sub-routine 1500A may proceed to execution block 1520A; otherwise emergency detection sub-routine 1500A may proceed to termination block 1599A.

Emergency detection sub-routine 1500A may provide a beacon emergency notification at execution block 1520A.

Emergency detection sub-routine 1500A may return, e.g. to relay monitoring routine 1400, at termination block 1599A.

A Second Exemplary Emergency Detection Sub-Routine

Figure 15B:
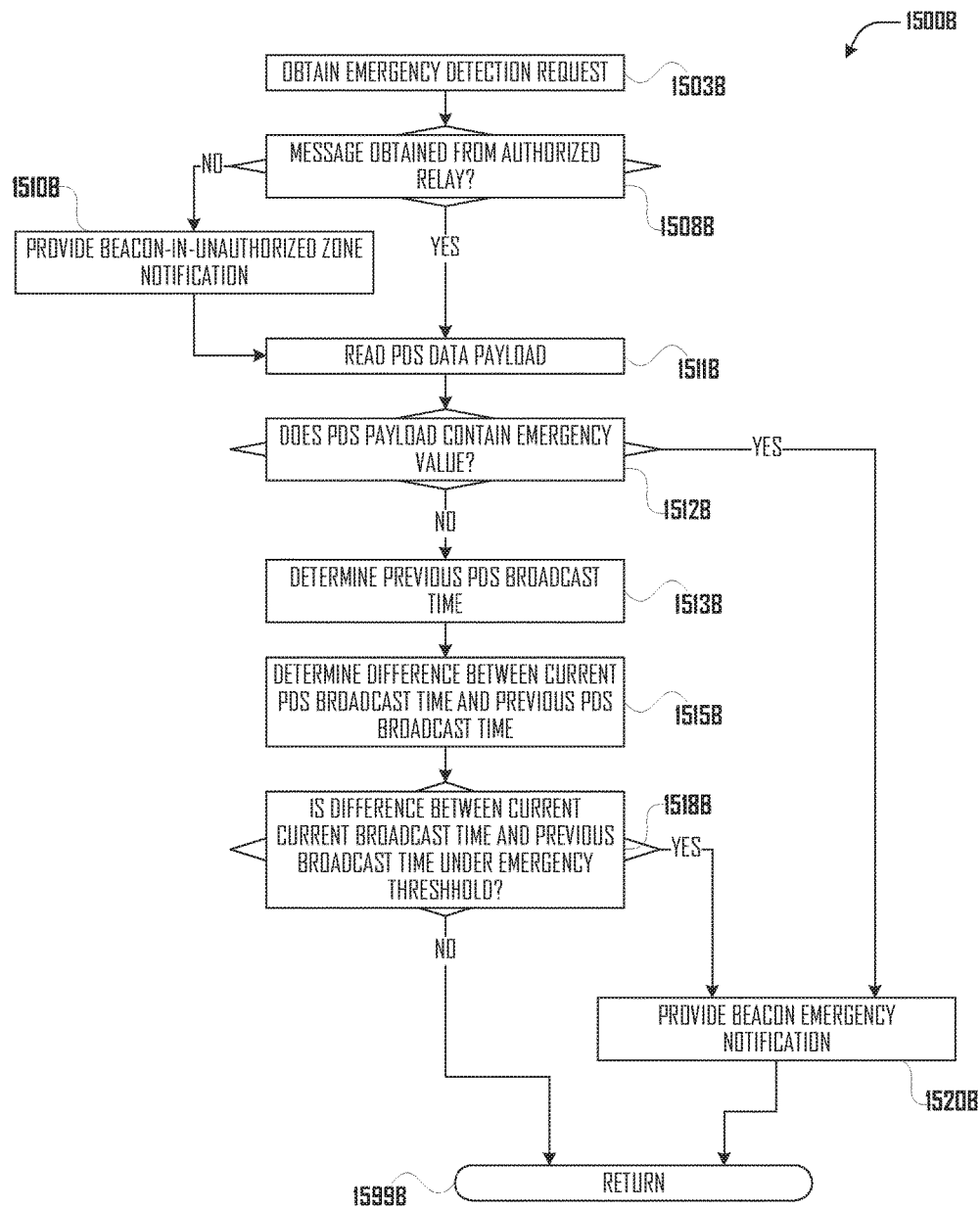

FIG. 15B illustrates a second exemplary emergency detection sub-routine 1500B. Emergency detection sub-routine 1500B may represent a portion of the functionality of beacon monitoring service 225A being executed by central processing unit 203 of monitoring server 200 in cooperation with various other hardware and software components of the present methods and systems (e.g. second beacon broadcast routine 1100B). Emergency detection sub-routine 1500B is similar to emergency detection sub-routine 1500A, however, instead of detecting an emergency only by determining the delay between a relay's successive proximate data signals, emergency detection sub-routine 1500B detects an emergency by determining the delay between a relay's successive proximate data signals and by reading the payload of the proximate data signal.

Emergency detection sub-routine 1500B may obtain an emergency detection request at execution block 1503B. The emergency detection request may, for example, include a beacon identifier, a relay identifier, a current proximate data signal transmission time, and the like.

At decision block 1508B, if the relay identifier included in the emergency detection request corresponds to an authorized relay identifier, then emergency detection sub-routine 1500B may proceed to execution block 1511B; otherwise, emergency detection sub-routine 1500B may proceed to execution block 1510B.

Emergency detection sub-routine 1500B may provide a beacon-in-unauthorized zone notification at execution block 1510B.

Emergency detection sub-routine 1500B may read the payload of the current proximate data signal at execution block 1511B.

At decision block 1512B, if the proximate data signal payload contains an emergency value (as described above with respect to beacon broadcast routine 1100B), then emergency detection sub-routine 1500B may proceed to execution block 1520B; otherwise emergency detection sub-routine 1500B may proceed to execution block 1513B.

Emergency detection sub-routine 1500B may determine a previous proximate data signal broadcast time associated with the beacon identifier at execution block 1513B.

Emergency detection sub-routine 1500B may determine a difference between the current proximate data signal broadcast time and the previous proximate data signal broadcast time at execution block 1515B.

At decision block 1518B, if the difference between the current proximate data signal transition time and the previous proximate data signal transition time less than an emergency threshold value, then emergency detection sub-routine 1500B may proceed to execution block 1520B; otherwise emergency detection sub-routine 1500B may proceed to termination block 1599B.

Emergency detection sub-routine 1500B may provide a beacon emergency notification at execution block 1520B.

Emergency detection sub-routine 1500B may return, e.g. to relay monitoring routine 1400, at termination block 1599B.

An Exemplary Beacon Loss Detection Sub-Routine

Figure 16:
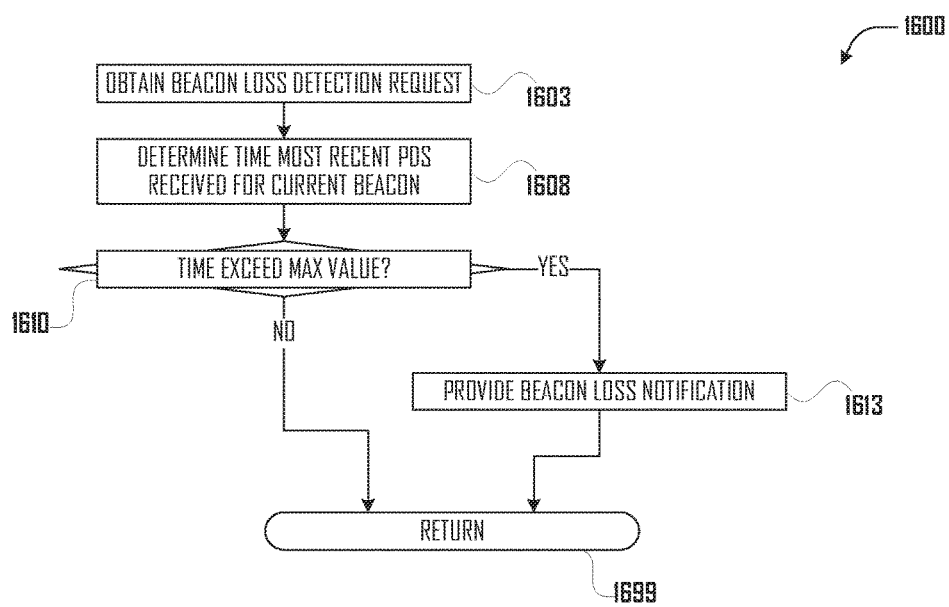
FIG. 16 illustrates a flow diagram of an exemplary beacon loss detection sub-routine in accordance with at least one embodiment.

FIG. 16 illustrates an exemplary beacon loss detection sub-routine 1600. Beacon loss detection sub-routine 1600 may represent a portion of the functionality of beacon monitoring service 225A being executed by central processing unit 203 of monitoring server 200 in cooperation with various other hardware and software components of the present methods and systems.

Beacon loss detection sub-routine 1600 may obtain a beacon lost detection request at execution block 1603. The beacon lost detection request may, for example, include a beacon identifier and the like.

Beacon loss detection sub-routine 1600 may determine a time since a most recent proximate data signal broadcast associated with the current beacon identifier at execution block 1608.

At decision block 1610, if the time since the most recent proximate data signal broadcast associated with the current beacon identifier exceeds a maximum threshold value, then beacon loss detection sub-routine 1600 may proceed to execution block 1613; otherwise beacon loss detection sub-routine 1600 may proceed to termination block 1699.

Beacon loss detection sub-routine 1600 may provide a beacon loss notification at execution block 1613.

Beacon loss detection sub-routine 1600 may return, e.g. to relay monitoring routine 1400, at termination block 1699.

The invention claimed is:

1. A proximal physical location tracking and management system comprising:
   a monitoring server including a server central processing unit, a server network interface, and server memory;
   a plurality of relay stations, each of said plurality of relay stations including a relay station central processing unit, a relay station network interface, a wireless proximate data signal receiver, and relay station memory and each of said plurality of relay stations being in data communication with said monitoring server; and
   a plurality of beacons, including a first beacon, each of said plurality of beacons including an emergency sensor, a beacon central processing unit, a wireless proximate data signal transmitter, and beacon memory including instructions for causing said central processing unit to execute a beacon method, said beacon method including:
      broadcasting a proximate data signal via said wireless proximate data signal transmitter at a first frequency of broadcasts and
      upon detecting an emergency interrupt provided by said emergency sensor, broadcasting said proximate data signal via said wireless proximate data signal transmitter at a second frequency of broadcasts,
   wherein said proximate data signal is a Bluetooth pairing request.

2. The proximal physical location tracking and management system of claim 1, wherein said second frequency of broadcasts is at least five times greater than said first frequency of broadcasts.

3. The proximate physical location tracking management system of claim 1, wherein no beacons of said plurality of beacons are paired with any relay station of said plurality of relay stations.

4. A proximal physical location tracking and management system comprising:
   a monitoring server including a server central processing unit, a server network interface, and server memory;
   a plurality of relay stations, each of said plurality of relay stations including a relay station central processing unit, a relay station network interface, a wireless proximate data signal receiver, and relay station memory and each of said plurality of relay stations being in data communication with said monitoring server; and
   a plurality of beacons, including a first beacon, each of said plurality of beacons including an emergency sensor, a beacon central processing unit, a wireless proximate data signal transmitter, and beacon memory including instructions for causing said central processing unit to execute a beacon method, said beacon method including:
      broadcasting a proximate data signal via said wireless proximate data signal transmitter at a first frequency of broadcasts and
      upon detecting an emergency interrupt provided by said emergency sensor, broadcasting said proximate data signal via said wireless proximate data signal transmitter at a second frequency of broadcasts,
   wherein said plurality of beacons do not include a wireless proximate data signal receiver.

5. The proximal physical location tracking management system of claim 1, wherein said proximate data signal includes a data payload and said beacon method includes, upon detecting said emergency interrupt provided by said emergency sensor, changing the data payload of said proximate data signal from a standard value to an emergency value.

6. The proximal physical location tracking management system of claim 1, wherein said relay station memory includes instructions for causing said relay station central processing unit to execute a relay station method and said relay station method includes, upon receiving a proximate data signal broadcast from a first beacon of said plurality of beacons, providing a corresponding relay update message to said monitoring server.

7. The proximal physical location tracking management system of claim 6, wherein said server memory includes instructions for causing said server central processing unit to execute a server method, said server method including:
   obtaining a plurality of relay update messages from a first relay station of said plurality of relay stations;
   determining said first beacon of said plurality of beacons is broadcasting said proximate data signal at said second frequency of broadcasts; and
   providing an alert message, said alert message including a beacon identifier associated with said first beacon.

8. The proximal physical location tracking management system of claim 7, wherein said server method includes identifying a location of said first beacon.

9. The proximal physical location tracking management system of claim 6, wherein said plurality of relay stations are physically deployed in a deployment area and said server memory includes instructions for causing said server central processing unit to execute a server method, said server method including:
   obtaining a plurality of relay update messages from a first relay station of said plurality of relay stations;
   determining a current location of said first beacon within said deployment area;
   determining said first beacon is not permitted to be at said current location; and providing an alert message, said alert message including a beacon identifier associated with said first beacon and identifying said current location.

10. The proximal physical location tracking management system of claim 6, wherein said server memory includes instructions for causing said server central processing unit to execute a server method, said server method including:
  determining an expected relay update message associated with said first beacon has not been obtained; and
  providing an alert message, said alert message including a beacon identifier associated with said first beacon.

11. The proximal physical location tracking management system of claim 1, wherein each of said plurality of beacons includes a power source, said proximate data signal includes a data payload, and said beacon method includes, upon detecting a power level of said power source has dropped below a threshold value, changing the data payload of said proximate data signal to from a standard value to a low-power indicator value.

12. A proximal physical location tracking and management method comprising:
  broadcasting, by a beacon, a series of proximate data signals at a first frequency of broadcasts;
  upon detecting, by said beacon, an emergency interrupt provided by an emergency sensor, broadcasting, by said beacon, said series of proximate data signals at a second frequency of broadcasts;
  upon receiving, by a relay station, a first proximate data signal of said series of proximate data signals;
  providing, by said relay station, a relay update message corresponding to said first proximate data signal to a monitoring server;
  obtaining, by said monitoring server, a plurality of relay update messages from said relay station;
  determining, by said monitoring server, said beacon is broadcasting said proximate data signal at said second frequency of broadcasts; and
  providing, by said monitoring server, an alert message, said alert message including a beacon identifier associated with said beacon and identifying a location of said beacon.

13. The proximal physical location tracking method of claim 12, wherein said second frequency of broadcasts is at least five times greater than said first frequency of broadcasts.

14. The proximal physical location tracking management method of claim 12, wherein said proximate data signal is a Bluetooth pairing request.

15. The proximate physical location tracking management method of claim 12, wherein said beacon is not paired with said relay station.

16. The proximal physical location tracking management method of claim 12, wherein said proximate data signal includes a data payload having a standard value and the method further comprises:
  upon detecting, by said beacon, said emergency interrupt, changing the data payload of said proximate data signal to an emergency value; and
  determining, by said monitoring server, said beacon is broadcasting said proximate data signal with said emergency value.

17. The proximal physical location tracking management method of claim 12, further comprising:
  obtaining, by said monitoring server, a plurality of relay update messages from said relay station;
  determining, by said monitoring server, a current location of said beacon within a deployment area;
  determining, by said monitoring server, said beacon is not permitted to be at said current location; and
  providing, by said monitoring server, an alert message, said alert message including a beacon identifier associated with said first beacon and identifying said current location.

18. The proximal physical location tracking management method of claim 12, the method comprising:
  determining, by said monitoring server, an expected relay update message associated with said first beacon has not been obtained; and
  providing an alert message, said alert message including a beacon identifier associated with said first beacon.

19. The proximal physical location tracking management method of claim 12, wherein said beacon includes a power source, said proximate data signal includes a data payload, and said method includes, upon detecting a power level of said power source has dropped below a threshold value, changing the data payload of said proximate data signal to from a standard value to a low-power indicator value.

* * * * *